US007742197B2

(12) United States Patent
Takiyama et al.

(10) Patent No.: US 7,742,197 B2
(45) Date of Patent: Jun. 22, 2010

(54) IMAGE PROCESSING APPARATUS THAT EXTRACTS CHARACTER STRINGS FROM A IMAGE THAT HAS HAD A LIGHT COLOR REMOVED, AND CONTROL METHOD THEREOF

(75) Inventors: Yasuhiro Takiyama, Yokohama (JP); Junnosuke Yokoyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 478 days.

(21) Appl. No.: 11/765,604

(22) Filed: Jun. 20, 2007

(65) Prior Publication Data

US 2008/0019746 A1 Jan. 24, 2008

(30) Foreign Application Priority Data

Jul. 20, 2006 (JP) .............................. 2006-198708
Apr. 11, 2007 (JP) .............................. 2007-104216

(51) Int. Cl.
*H04N 1/40* (2006.01)

(52) U.S. Cl. ...................... 358/3.28; 358/1.1; 358/1.14; 399/366

(58) Field of Classification Search .................. 358/1.1, 358/1.9, 3.28, 1.14, 1.18, 448, 450; 399/366
See application file for complete search history.

(56) References Cited

U.S. PATENT DOCUMENTS

| | | | | |
|---|---|---|---|---|
| 5,640,467 | A * | 6/1997 | Yamashita et al. | 382/181 |
| 5,752,152 | A * | 5/1998 | Gasper et al. | 399/366 |
| 5,781,653 | A * | 7/1998 | Okubo | 382/135 |
| 6,580,820 | B1 * | 6/2003 | Fan | 382/135 |
| 2006/0279767 | A1 * | 12/2006 | Lim | 358/1.14 |

FOREIGN PATENT DOCUMENTS

| | | |
|---|---|---|
| JP | 10-13681 | 1/1998 |
| JP | 2001-346032 | 12/2001 |
| JP | 2004-166180 | 6/2004 |

* cited by examiner

*Primary Examiner*—Thomas D Lee
(74) *Attorney, Agent, or Firm*—Fitzpatrick, Cella, Harper & Scinto

(57) ABSTRACT

One or more character strings are extracted from within an inputted image. The extracted character strings are retrieved to find one or more identical character strings. A determination is then made as to whether or not the identical character strings are laid out regularly, with processing performed on the inputted image depending on the findings of the determination.

15 Claims, 32 Drawing Sheets

FIG. 12

DOT CONCENTRATED DITHER MATRIX

| | | | |
|---|---|---|---|
| 6 | 7 | 8 | 9 |
| 5 | 0 | 1 | 10 |
| 4 | 3 | 2 | 11 |
| 15 | 14 | 13 | 12 |

FIG. 13

DOT DISTRIBUTED DITHER MATRIX

| | | | |
|---|---|---|---|
| 0 | 8 | 2 | 10 |
| 12 | 4 | 14 | 6 |
| 3 | 11 | 1 | 9 |
| 15 | 7 | 13 | 5 |

DENSITY SIGNAL VALUE 2

DENSITY SIGNAL VALUE 4

DENSITY SIGNAL VALUE 5

FIG. 20

| | ATTRIBUTE | X COORDINATE | Y COORDINATE | WIDTH W | HEIGHT H | POINTER TO OCR INFORMATION |
|---|---|---|---|---|---|---|
| BLOCK 1 | 1 | X1 | Y1 | W1 | H1 | 0x0000_0100 |
| BLOCK 2 | 1 | X2 | Y2 | W2 | H2 | 0x0000_0200 |
| BLOCK 3 | 1 | X3 | Y3 | W3 | H3 | 0x0000_0300 |
| BLOCK 4 | 1 | X4 | Y4 | W4 | H4 | 0x0000_0400 |
| BLOCK 5 | 1 | X5 | Y5 | W5 | H5 | 0x0000_0500 |
| BLOCK 6 | 1 | X6 | Y6 | W6 | H6 | 0x0000_0600 |
| BLOCK 7 | 1 | X7 | Y7 | W7 | H7 | 0x0000_0700 |
| BLOCK 8 | 1 | X8 | Y8 | W8 | H8 | 0x0000_0800 |
| BLOCK 9 | 1 | X9 | Y9 | W9 | H9 | 0x0000_0900 |
| ⋮ | ⋮ | ⋮ | ⋮ | ⋮ | ⋮ | ⋮ |

IMAGE PROCESSING APPARATUS THAT EXTRACTS CHARACTER STRINGS FROM A IMAGE THAT HAS HAD A LIGHT COLOR REMOVED, AND CONTROL METHOD THEREOF

BACKGROUND OF THE INVENTION

Field of the Invention

The present invention relates to a technology that processes an original image that includes a copy-forgery-inhibited pattern image, which consists of a background and a latent image.

A multi-function peripheral has been proposed that is capable of a background removal process that removes an under color from a source image, as well as adjusting an output density of the original document. One such example is found in Cited Reference No. 1, Japanese Patent Laid Open No. 1998-013681. The under color removal process has the effect of causing text that is written on an original document that is yellowed with age to be printed in clear black characters on a clean white background when making a black-and-white copy thereof. Thus, the under color removal process is a process of removing a faint or faded color within the image.

When official documents, such as a Japanese Certificate of Residence or a Certified Copy of a Japanese Family Register, are duplicated, however, information appears in the copy thereof that is intended to signify that the copy is a duplicate, and not an original document. An image wherein information appears in a copy thereof that is intended to signify that the copy is a duplicate, and not an original document, is referred to as a "copy-forgery-inhibited pattern image". A latent image component, i.e., a region within a duplicate or other sequence of text, has a pattern of dots positioned therein of a density that is capable of being reproduced by a copier. A background component, i.e., a region other than the latent image, has a pattern of dots positioned therein of a density that is capable of being reproduced by a copier only with difficulty. It is difficult to distinguish the difference in density between the respective regions with the naked eye. Cited Reference No. 2, Japanese Patent Laid Open No. 2001-346032, and Cited Reference No. 3, Japanese Patent Laid Open No. 2004-166180, disclose technologies that create the copy-forgery-inhibited pattern image.

The Cited Reference No. 2 performs embedding of information of a digital watermark nature by positioning dots in a "/" or "\" shape in the latent image component of the copy-forgery-inhibited pattern image. When the copier encounters the dots in the "/" or "\" shape in the inputted image, it reads the information from the sequence in which the dots are positioned.

The Cited Reference No. 3 positions the dots in a particular pattern in the latent image component of the copy-forgery-inhibited pattern image. When the copier encounters the dots of the particular pattern in the inputted image, it reads the information from the sequence in which the dots are positioned.

Patent applications exist that involve the copy-forgery-inhibited pattern image and the digital watermark, thus disclosing technologies that interfere with copying by embedding copy-interference information in the digital watermark information.

The Cited References Nos. 1 through 3 are recapitulated as follows:

Cited Reference No. 1: Japanese Patent Laid Open No. 1998-013681;

Cited Reference No. 2, Japanese Patent Laid Open No. 2001-346032;

Cited Reference No. 3, Japanese Patent Laid Open No. 2004-166180.

For present purposes, it is presumed that a Company A employs the technology disclosed in the Cited Reference No. 2 to generate the copy-forgery-inhibited pattern image with the copy-interference information embedded therein. In such a circumstance, Company A's copier interrupts a copy job if it involves attempting to copy the copy-forgery-inhibited pattern image. A copier from a company B, on the other hand, executes the copy job that involves copying the copy-forgery-inhibited pattern image. The reason is that Company B cannot perform an analysis of the copy-interference information that Company A embeds in an image.

Creating an information analysis algorithm necessitates knowledge of an information embedding algorithm. And performing the particular processing on the copy-forgery-inhibited pattern image, for example, copy-interference, requires the creation of the information analysis algorithm.

Even if the technologies recited in the Cited References Nos. 2 and 3 are built into the copier, it would only be possible for the copier to recognize a smattering of the copy-forgery-inhibited pattern images that are in general use.

SUMMARY OF THE INVENTION

The present invention offers an image processing apparatus and a control method thereof that is capable of recognizing a wider range of the copy-forgery-inhibited pattern images as being copy-forgery-inhibited pattern images, by focusing on a traditional characteristic of the copy-forgery-inhibited pattern images in order to recognize them as such.

According to one aspect of the present invention, there is provided an image processing apparatus, comprising: a retrieval unit adapted to extract a plurality of character strings that are present within an inputted image, and retrieve a plurality of identical character strings within the plurality of character strings thus extracted; a determination unit adapted to determine whether or not the plurality of identical character strings retrieved by the retrieval unit are laid out regularly; and a processing unit adapted to carry out a process on the inputted image in response to a determination result of the determination unit.

According to another aspect of the present invention, there is provided a control method of an image processing apparatus, comprising: extracting a plurality of character strings that are present within an inputted image; determining whether or not each respective character string extracted in the extraction step is laid out regularly; and carrying out a process on the inputted image in response to a determination result in the determination step.

Further features of the invention will become apparent from the following detailed descriptions, with reference to the attached drawings.

BRIEF DESCRIPTION OF THE DRAWINGS

FIG. 12 depicts an example of a dot concentrated dither matrix.

FIG. 13 depicts an example of a dot distributed dither matrix.

FIG. 20 depicts an example of a block information of the source image that was depicted in FIG. 18.

DESCRIPTION OF THE EMBODIMENTS

Following is a detailed description of the preferred embodiments of the present invention, with reference to the attached drawings.

First Embodiment

According to a first embodiment, there is a description of a method of controlling a copying of an original document that includes a copy-forgery-inhibited pattern that is configured of a latent image and a background, so as to not perform an under color removal function or a density correction function on the source image. The description according to the first embodiment will cite a digital multi-function peripheral as an example of an image processing apparatus that carries out the method of the present invention.

Figure 1:
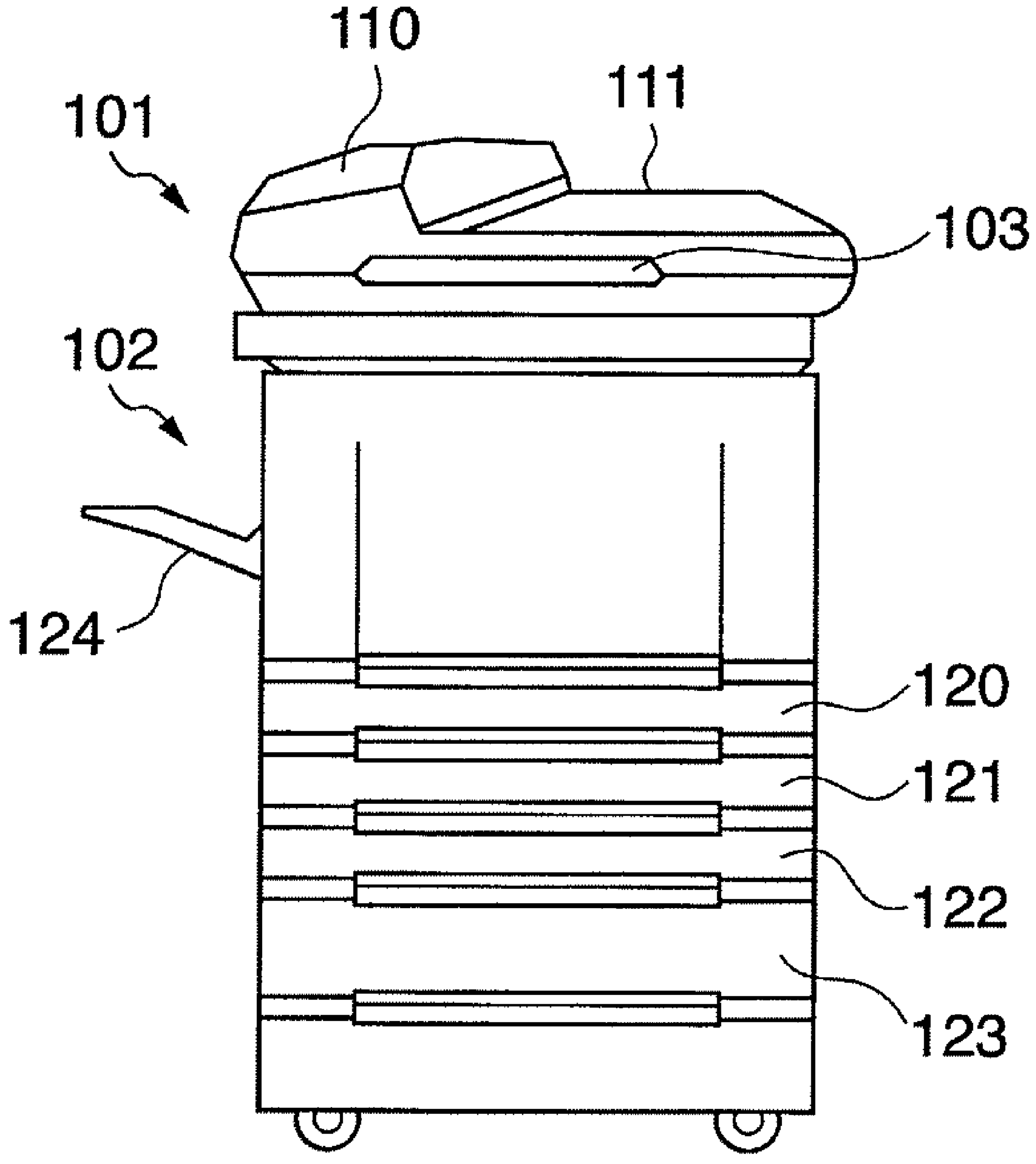
FIG. 1 depicts an external view of a digital multi-function peripheral according to a first embodiment.

FIG. 1 depicts an external view of the digital multi-function peripheral according to the first embodiment. In FIG. 1, the digital multi-function peripheral is configured of a scanner unit 101 and a printer unit 102. Following is a detailed description of the scanner unit 101 and the printer unit 102.

Scanner Unit 101

The scanner unit 101, as depicted in FIG. 1, is an image input device. A scanner unit (not shown) shines a light on an original image, and a CCD line sensor (not shown) converts the light reflected therefrom into an electronic signal. The original document is placed on a tray 111 of a document feeder 110, which feeds the original document, one sheet at a time, performing the reading-in operation of the original image, in response to a user issuing a command, via an operation unit 103, to commence reading in the original document.

Printer Unit 102

The printer unit 102, as depicted in FIG. 1, is a unit that prints a raster image data that is read in via the scanner unit 101 as an image on a sheet of printer paper. Printing methods include an electrophotographic method, which uses a photoconductive drum or a photoconductive belt, or an inkjet method, which discharges ink through an array of tiny nozzles to directly print the image onto the sheet of printer paper. The precise method that is used, however, is irrelevant. The printer unit 102 possesses a plurality of printing paper trays, allowing selecting either a different printing paper size or orientation, with printing paper cartridges 120 through 123 loaded, each cartridge corresponding to a given printing paper size or orientation. An output tray 124 receives the finished printouts.

Digital Multifunction Peripheral System Configuration

Figure 2:
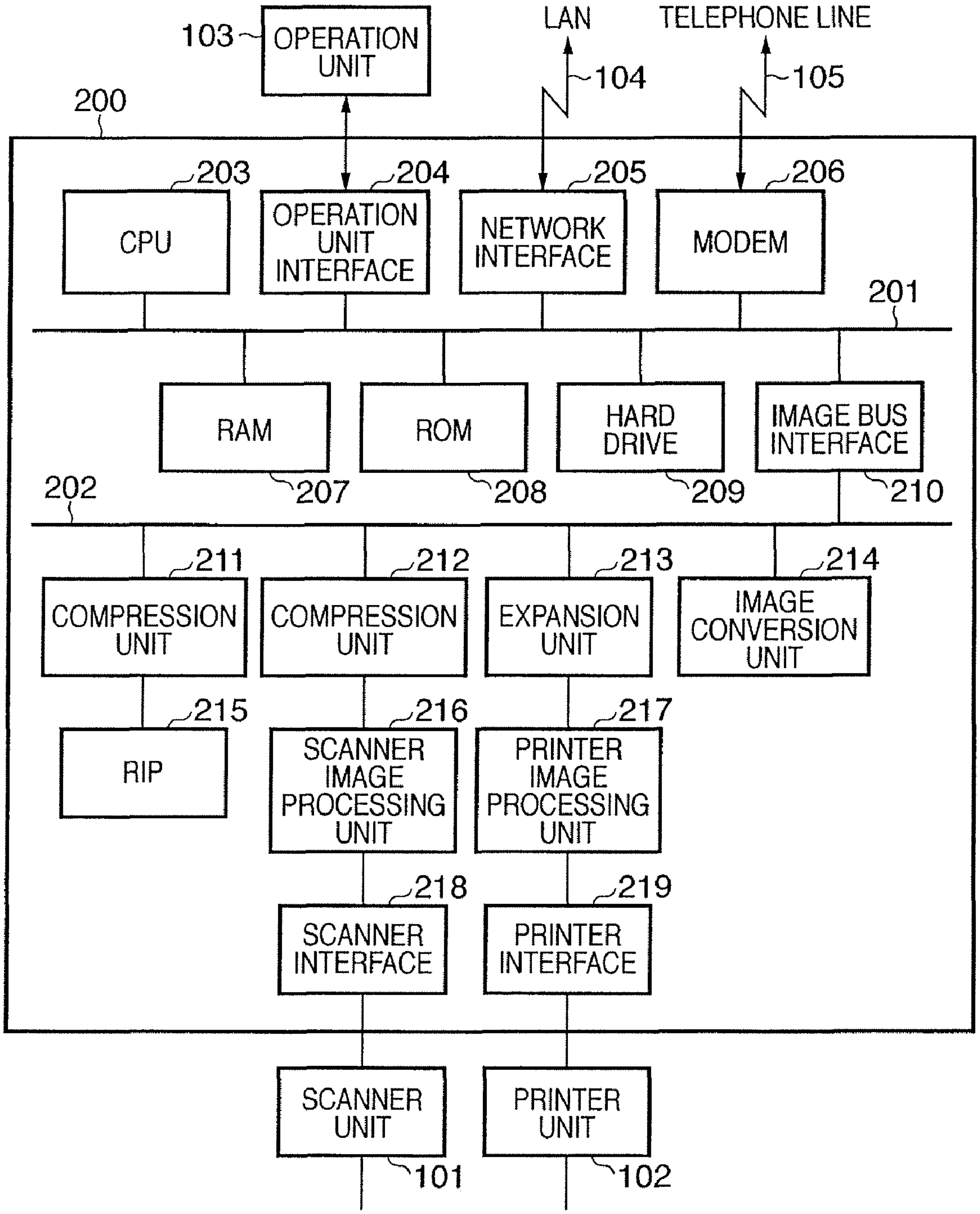
FIG. 2 depicts a system configuration of the digital multi-function peripheral according to the first embodiment.

FIG. 2 depicts a system configuration of the digital multi-function peripheral according to the first embodiment. A controller unit 200 that is depicted in FIG. 2 performs input and output of image information and a device information by connecting to the scanner unit 101 and the printer unit 102, as well as to a LAN 104 or a telephone line 105.

A CPU 203 functions as a controller of the digital multi-function peripheral as a whole. A RAM 207 is used as a system memory workspace that the CPU 203 uses in its operations, as well as an image memory that temporarily stores image data. A ROM 208 is used as a boot ROM, wherein is stored a boot program of the digital multi-function peripheral.

A hard disk drive (HDD) 209 stores such as system software and the image data. The HDD 209 stores such information as an image output speed or an installation position of a node that is connected over the network, i.e., the LAN, 104.

An operation unit interface 204 is an interface between a user and the operation unit 103, outputting the image data that is displayed in the operation unit 103 to the operation unit 103. The operation unit interface 204 also serves to communicate the information that the user inputs, from the operation unit 103 to the CPU 203.

A network interface 205 connects to the LAN 104, and controls the input and output of the information thereby. A modem 206 connects to a telephone line 105, and performs modulation and demodulation processing in order to perform transmission and reception of data.

The foregoing devices are positioned on a system bus 201.

An image bus interface 210 provides a bus bridge by being connected to an image bus 202, which transfers the image data at high speed to and from the system bus 201, and converting the data structure.

A raster image processor (RIP) 215 processes a page description language (PDL) code into a bitmap image. A scanner interface 218 connects to the scanner 101 and performs a conversion of the image data between a synchronous and an asynchronous system. A scanner image processing unit 216 performs correction, modification, and editing of the image data that is received from the scanner unit 101, via the scanner interface 218.

The scanner image processing unit 216 determines such things as whether or not the received image data is a color or a black-and-white original document, as well as whether or not the original document is text or a photograph. The result of the determination, which is appended to the image data, is referred to as accompanying information. A detailed description of the processing that is performed by the scanner image processing unit 216 will be provided hereinafter.

A compression unit 211 and 212 receives, compresses, and outputs the image data. An expansion unit 213 expands the image data, which it sends to a printer image processing unit 217, which, upon receiving the image data that is sent thereto from the expansion unit 213, and performs image processing on the image data, with reference to an image region data that is attached to the image data. Once processed, the image data is outputted to the printer unit 102, via a printer interface 219. A detailed description of the processing that is performed by the printer image processing unit 217 will be provided hereinafter.

An image conversion unit 214 performs a prescribed conversion process on the image data. A detailed description of the processing that is performed by the image conversion unit 214 will be provided hereinafter.

Scanner Image Processing Unit 216

Figure 3:
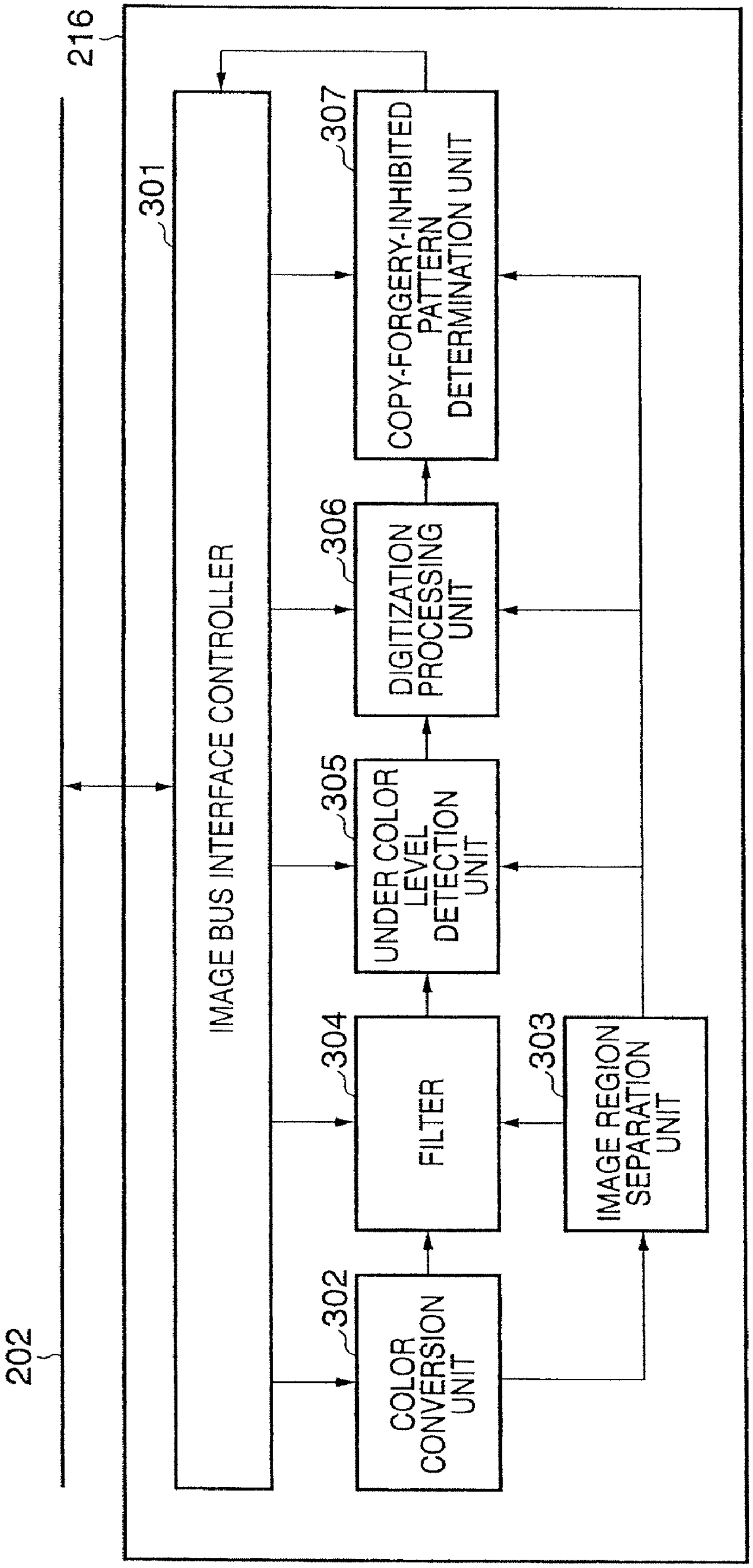
FIG. 3 depicts an example of a configuration of a scanner image processing unit 216 that is depicted in FIG. 2.

FIG. 3 depicts an example of a configuration of the scanner image processing unit 216 that is depicted in FIG. 2. An image bus interface controller 301 connects to the image bus 202, controls the bus access sequence thereof, and instigates the control and timing of each respective device within the scanner image processing unit 216. A color conversion unit 302 uses a look-up table to perform a conversion of the image data, to with, the brightness data that is read in, into a different color space. An image region separation unit 303 detects a text portion from the inputted image to determine the image region and generate an image region signal that is used in the subsequent image processing. A filter unit 304 uses a digital space filter to perform a convolution operation, according to such objectives as edge enhancement.

An under color level detection unit 305 aggregates a frequency of a pixel value within a page of an image, and, when the image data that is read in is from an original document with a faint color in the background, detects a level of the under color to be removed. A digitization processing unit 306 converts the inputted image into an editable digital file format. A copy-forgery-inhibited pattern determination unit 307 determines whether or not the read-in original image contains a character string that denotes a copy-forgery-inhibited pattern. Further details of the determination process will be provided hereinafter.

The image data that is processed by the scanner image processing unit 216 is sent over the image bus 202 via the image bus interface controller 301.

Printer Image Processing Unit 217

Figure 4:
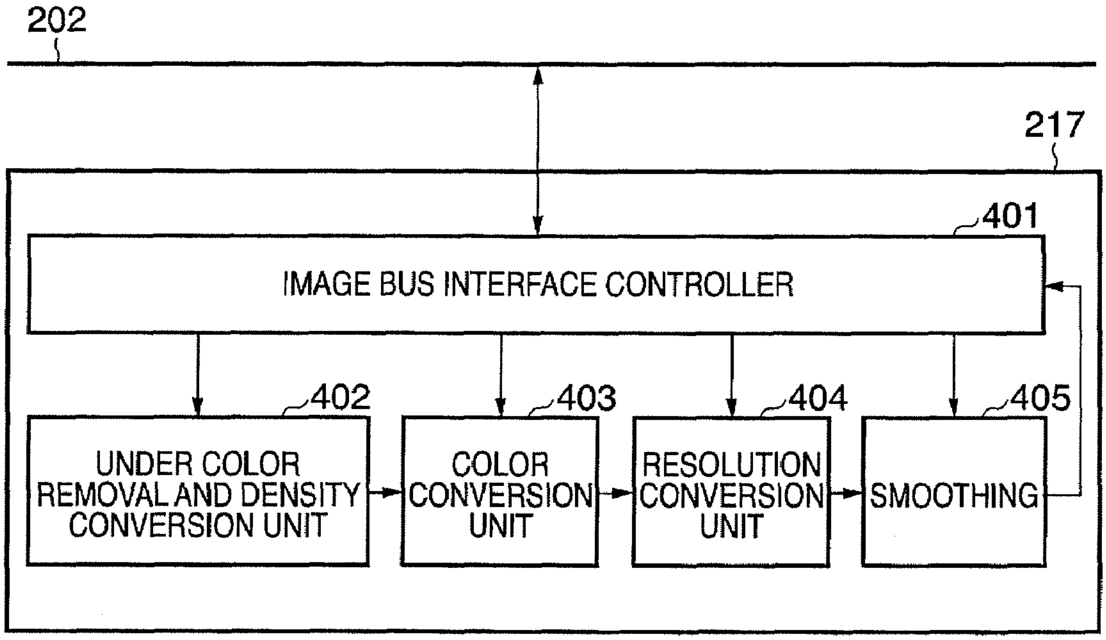
FIG. 4 depicts an example of a configuration of a printer image processing unit 217 that is depicted in FIG. 2.

FIG. 4 depicts an example of a configuration of the printer image processing unit 217 that is depicted in FIG. 2. An image bus interface controller 401 connects to the image bus 202, controls the bus access sequence thereof, and instigates the control and timing of each respective device within the printer image processing unit 217. An under color removal and density conversion unit 402 performs a removal of the background color and a density correction, in accordance with the under color level that is detected by the under color level detection unit 305. The under color removal is performed when an automated button that is displayed on an LCD control panel of the operation unit 103 is activated.

A color conversion unit 403 performs a color conversion that fits an output characteristic of the printer. A resolution conversion unit 404 converts the image data that is received via either the LAN 104 or the telephone line 105 into a resolution of the printer 102. A smoothing unit 405 smoothes a jaggy of the image data, post-resolution conversion.

Image Conversion Unit 214

Figure 5:
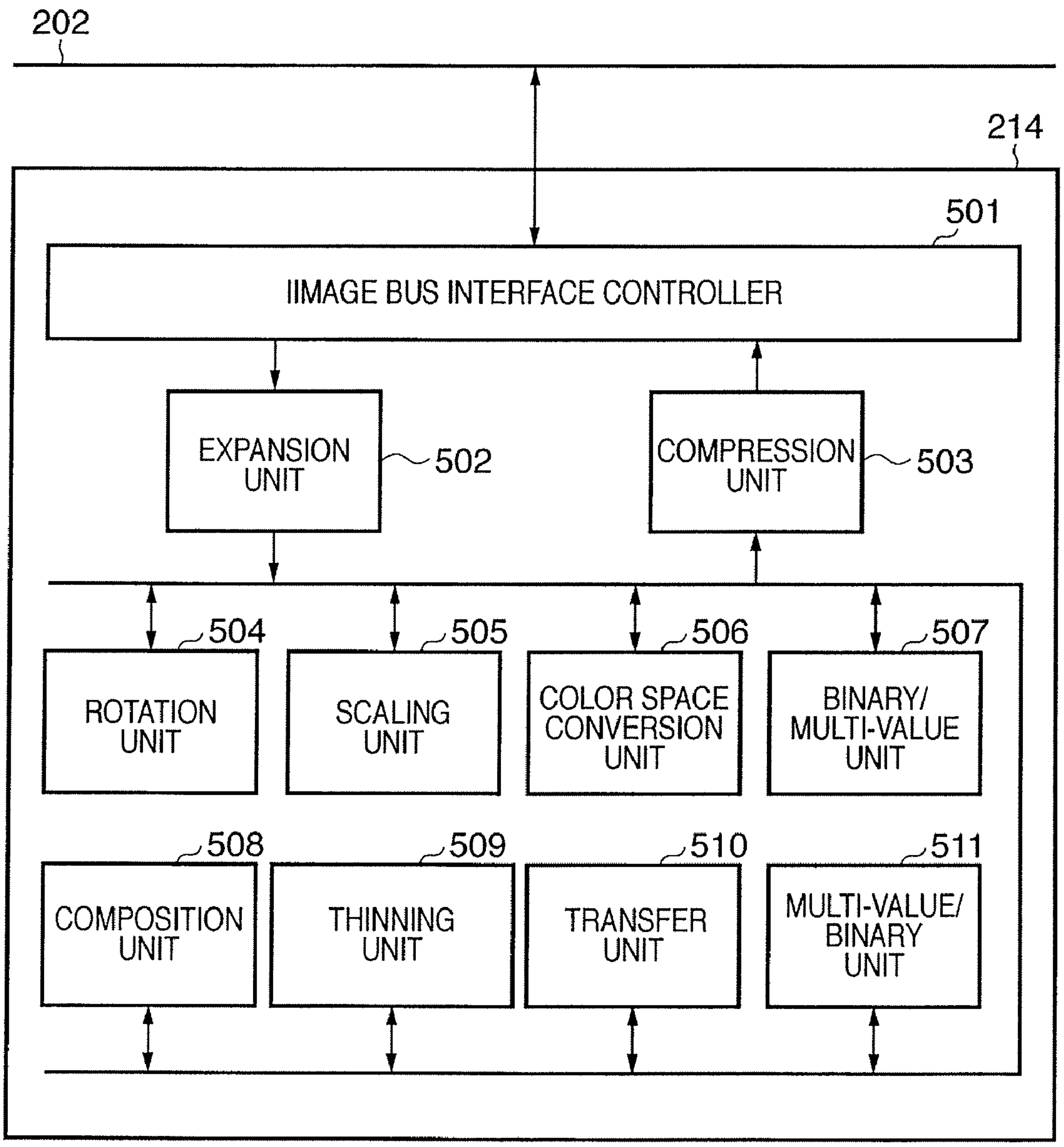
FIG. 5 depicts an example of a configuration of an image conversion unit 214 that is depicted in FIG. 2.

FIG. 5 depicts an example of a configuration of the image conversion unit 214 that is depicted in FIG. 2. The image conversion unit 214 performs a prescribed conversion process on the image data that is received via an image bus interface controller 501. In the present example, the image conversion unit 214 is configured of components such as the following.

An expansion unit 502 expands the received image data. A compression unit 503 compresses the received image data. A rotation unit 504 rotates the received image data. A scaling unit 505 performs a resolution conversion on the received image data, from 600 dpi to 200 dpi, for example.

A color space conversion unit 506 converts a color space of the received image data. The color space conversion unit 506 applies an established LOG conversion process, i.e., RGB-CMY, or an established output color correction process, i.e., CMY-CMYK. A binary/multi-value unit 507 converts a duotone image data into a 256-tone image data. Conversely, a multi-value/binary unit 511 converts the 256-tone image data into the duotone image data, using such techniques as error diffusion halftoning.

A composition unit 508 generates a single image data by compositing two pieces of received image data. When compositing two pieces of image data, a method is applied such as treating an average value of a brightness value that respective pixels that are targeted for composition possess as a composite brightness value, or treat a brightness value of a pixel with a lighter brightness value as a brightness value of a post-composition pixel. It would also be possible to use a method that takes a darker brightness value as a post-composition pixel. It would also be possible to apply a method such as determining the brightness value of a post-composition pixel by such operations as OR, AND, or XOR of the respective pixels that are targeted for composition. All of these composition methods are well-known techniques.

A thinning unit 509 executes a resolution conversion, generating such image data as ½, ¼, or ⅛, by thinning the received image data. A transfer unit 510 performs either an addition or a deletion of whitespace in the received image data.

Operation Unit 103

Figure 6:
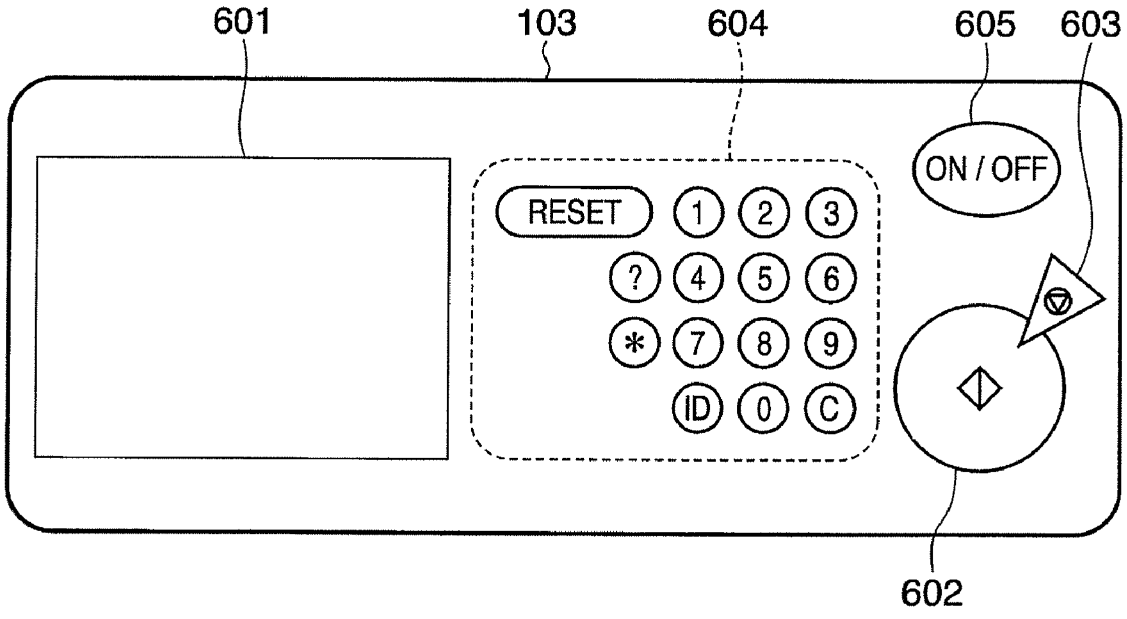
FIG. 6 depicts an example of a configuration of an operation unit 103 according to the first embodiment.

FIG. 6 depicts an example of a configuration of the operation unit 103 according to the first embodiment. An LCD control panel 601 combines an LCD with a touchscreen, and displays such as a configuration content and a software key. A start key 602 is a hardware key that directs a commencement of such as a copy operation. A green and a red LED are embedded therein, causing it to light up green when the operation may be started, and red when it may not.

A stop key 603 is a hardware key that is used when interrupting an operation. A hardware key suite 604 is built of a ten-key pad, a clear key, a reset key, a help key, and a user mode key. Reference numeral 605 is a hardware key that performs switching the power to the digital multi-function peripheral on and off.

Figure 7:
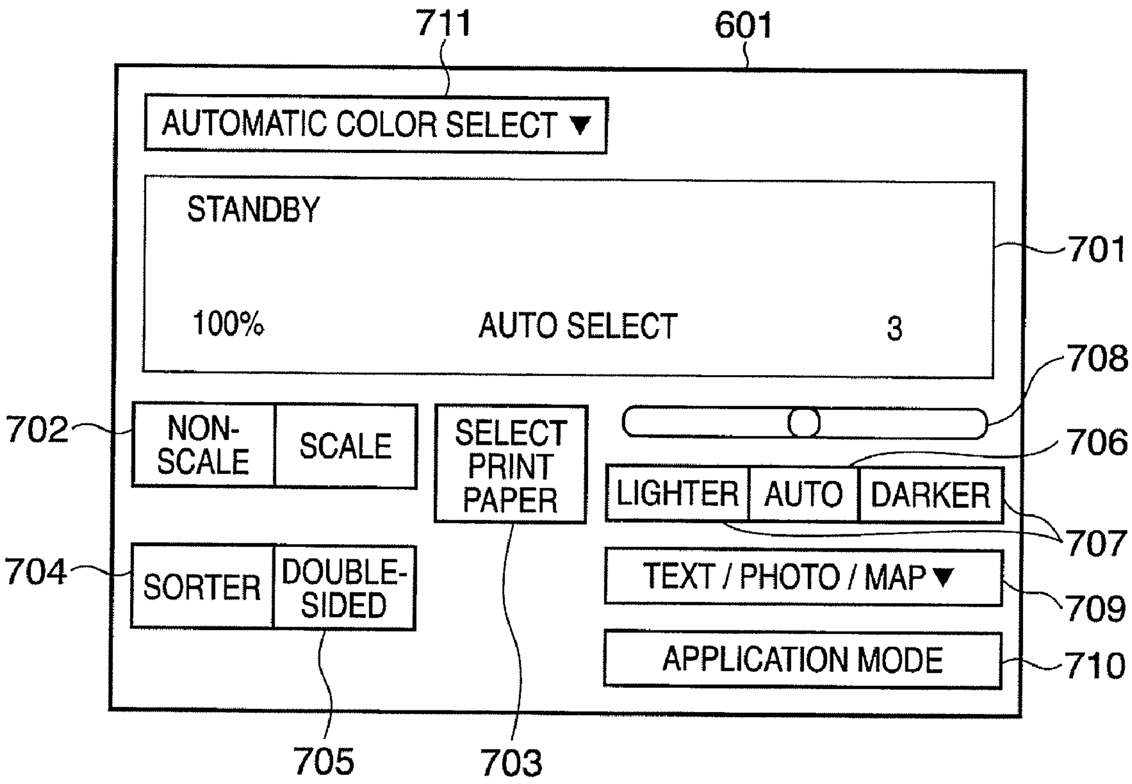
FIG. 7 depicts an example of a copy screen that is displayed in an LCD control panel 601.

FIG. 7 depicts an example of a copy screen that is displayed in the LCD control panel 601. A configuration display unit 701 displays a current operation status of the digital multi-function peripheral, a configured scale, a printing paper type, and a quantity of copies. A scale software key suite 702 displays software keys relating to scaling in duplication, i.e., a non-scale button and a scale button. A print paper selection button 703 is for transitioning to a screen that specifies such as a size, a color, and a material of the printing paper being used in the output. A sorter button 704 specifies a processing method of the printing paper being used in the output. A double-sided button 705 is depressed when the original document or the output method relates to double-sided printing.

An automatic button 706 specifies whether or not to automatically perform the under color removal that is the primary function according to the first embodiment. A density specification key suite 707 adjusts the density of either the image being read in or the image being outputted. The content of the setting is displayed in reference numeral 708. A document type specification button 709 is used when selecting the type of document. The pull-down menu selection options are "Text/Photo/Map" from which any of text, a photograph printout on regular printing paper, or a photograph printout on photographic paper is selected. An application mode button 710 switches to an application mode screen. A color selection button 711 specifies whether a printout will be color or black-and-white. The pull-down menu selection options are any of automatic color selection, full-color, or black-and-white.

Configuring the Copy-Forgery-Inhibited Pattern

Figure 8:
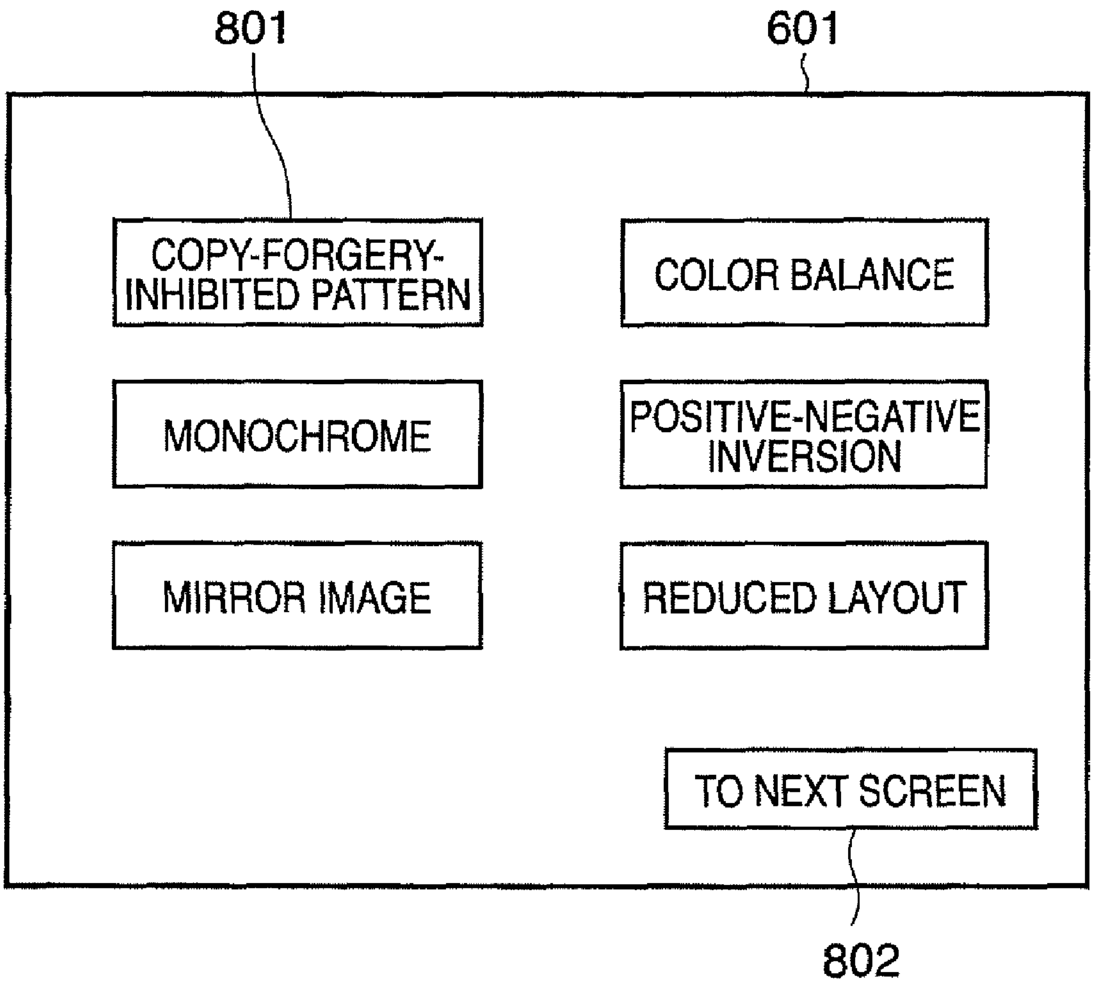
FIG. 8 depicts a screen that is displayed when an application mode button 710, as depicted in FIG. 7, is depressed.
Figure 9:
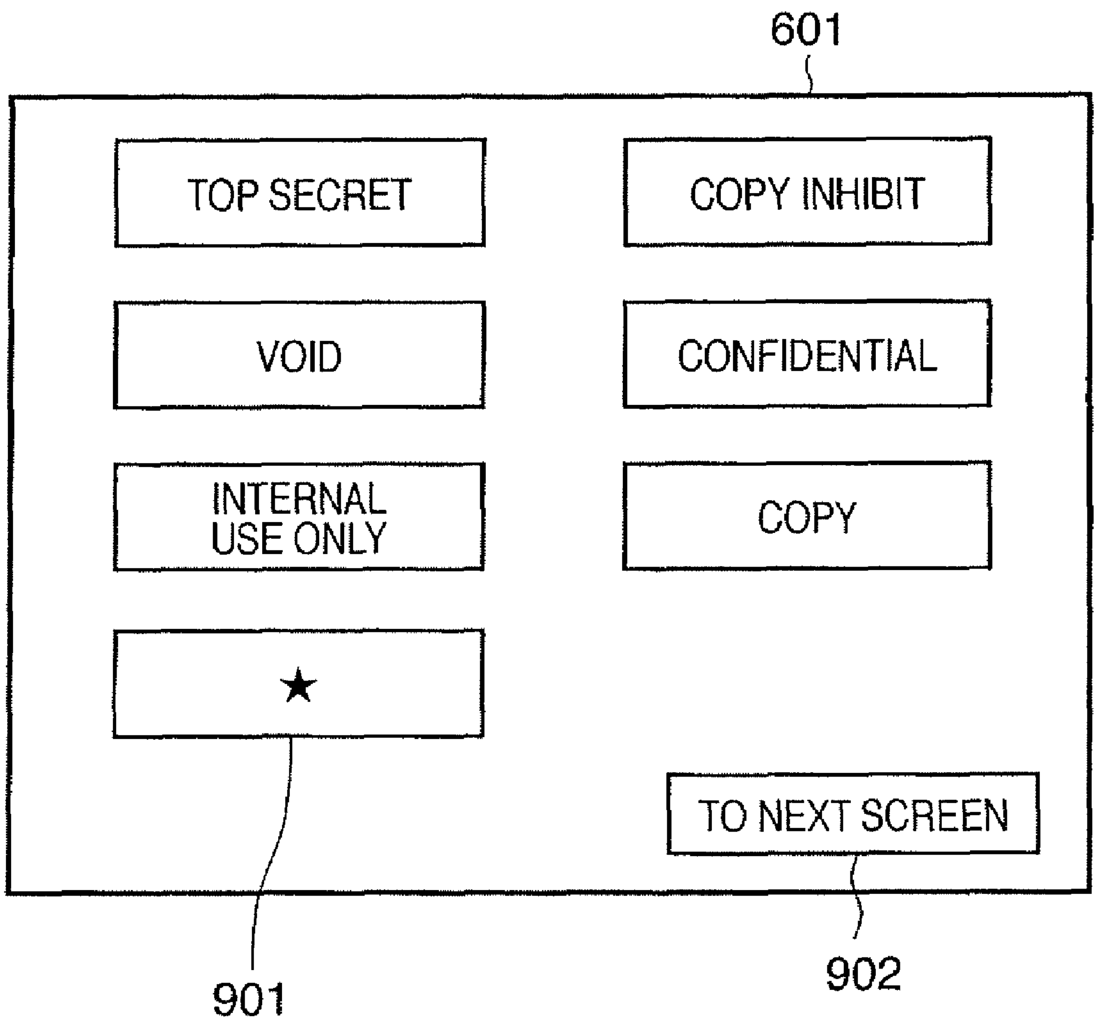
FIG. 9 depicts a screen that is displayed when a copy-forgery-inhibited pattern tab 801, as depicted in FIG. 8, is depressed.
Figure 10:
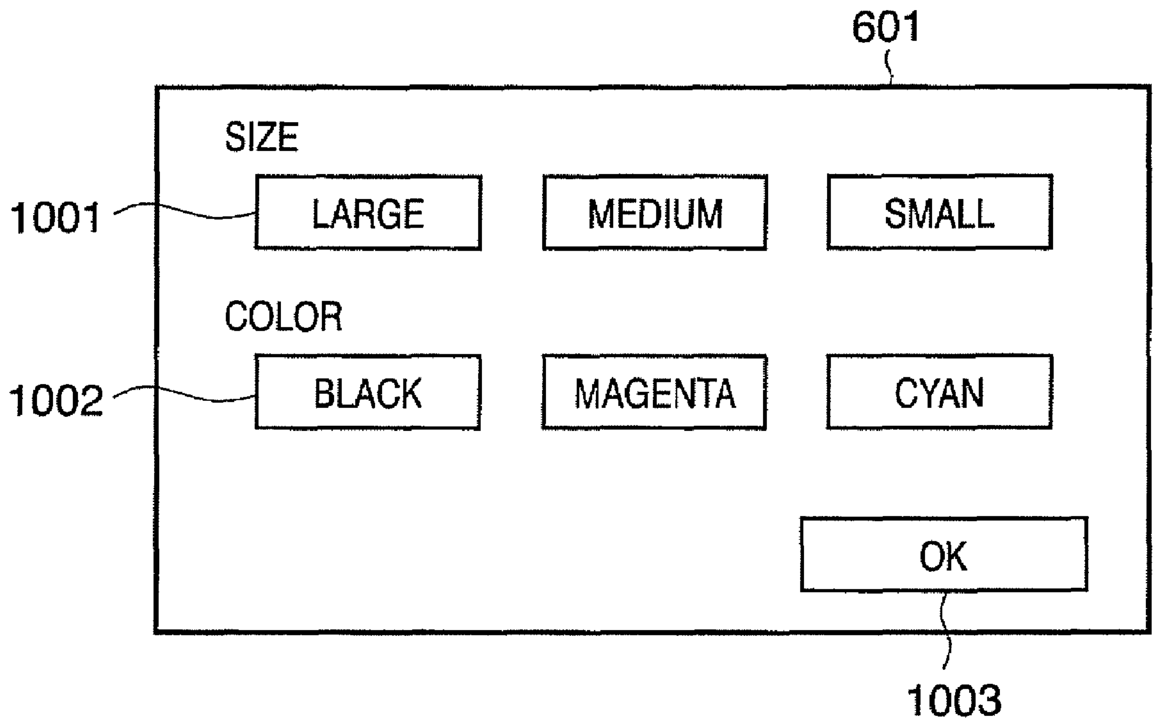
FIG. 10 depicts a screen that is displayed when a next tab 902, as depicted in FIG. 9, is depressed.

Following is a description of a method of configuring the copy-forgery-inhibited pattern, using the LCD control panel 601 as depicted in FIG. 8 through FIG. 10.

FIG. 8 depicts a screen that is displayed when the application mode button 710, as depicted in FIG. 7, is depressed. The user performs a setting in the screen relating to such as a reduced layout, a color balance, and the copy-forgery-inhibited pattern.

FIG. 9 depicts a screen that is displayed when a copy-forgery-inhibited pattern tab 801, as depicted in FIG. 8, is depressed. The user set such as character string information, i.e., "Top Secret", "Copy Inhibit", "Void", "Confidential", "Internal Use Only", or "Copy," or symbol information (★), as the latent image. For example, when configuring the symbol information (★) as the latent image, it would be permissible to depress a next tab 902 after depressing a symbol information tab 901.

FIG. 10 depicts a screen that is displayed when the next tab 902, as depicted in FIG. 9, is depressed. It is possible for the user to set a font size and a color herein for the latent image. Candidate font sizes 1001 are large, medium and small, and candidate colors 1002 are black, magenta, and cyan. Depressing an OK tab 1003 after setting the font and the color concludes the setting of the copy-forgery-inhibited pattern.

Image Forming Processing of Image Data with Copy-Forgery-Inhibited Pattern

Following is a description of a process of composition the original image that is read in via the scanner unit 101 with the copy-forgery-inhibited pattern, and forming the image on the output printing paper. The RAM 207 functions as a main memory and workspace for the CPU 203.

When the direction to attach the copy-forgery-inhibited pattern is performed in the control screens depicted in FIG. 8 through FIG. 15, the scanner unit 101 commences reading the original document in. The image data that is generated by the reading-in process is sent to the scanner image processing unit 216, wherein the prescribed image process is performed. The image data is sent to the compression unit 212, where it is compressed. The image data thus compressed is sent to the RAM 207, where it is stored, together with the image region data that is attached thereto.

The image data that is stored in the RAM 207 is sent to the image conversion unit 214, wherein the image data is expanded in the expansion unit 502, the prescribed process is performed in the color space conversion unit 506, the image data is compressed in the compression unit 503 and sent to the RAM 207, where it is stored. The latent image that denotes the copy-forgery-inhibited pattern that is composited with the image data in a process to be described hereinafter is stored as an uncompressed image data in the RAM 207.

The image data that is stored in the RAM 207 is sent to the image conversion unit 214. The expansion unit 502 expands the image data, which is sent to the composition unit 508. In similar fashion, the latent image is also sent to the composition unit 508, by way of the expansion unit 502.

The expansion unit 318 does expand the image data of the latent image, because the latent image is uncompressed to begin with.

The composition unit 508 composites the image data with the latent image. The image data with the latent image is sent to the compression unit 503, which compresses the composited image. The compressed image data is sent to the RAM 207, where it is stored. The composited image data stored in the RAM 207 is sent to the printer image processing unit 217.

When the prescribed processing is performed in the printer image processing unit 217, the composited image data is sent to the printer unit 102, via the printer interface 219. The printer unit 102 forms the composited image data into the image on the output printing paper. The sequence of the image forming process of the image with the copy-forgery-inhibited pattern, i.e., the composited image, is as per the foregoing.

Figure 11:
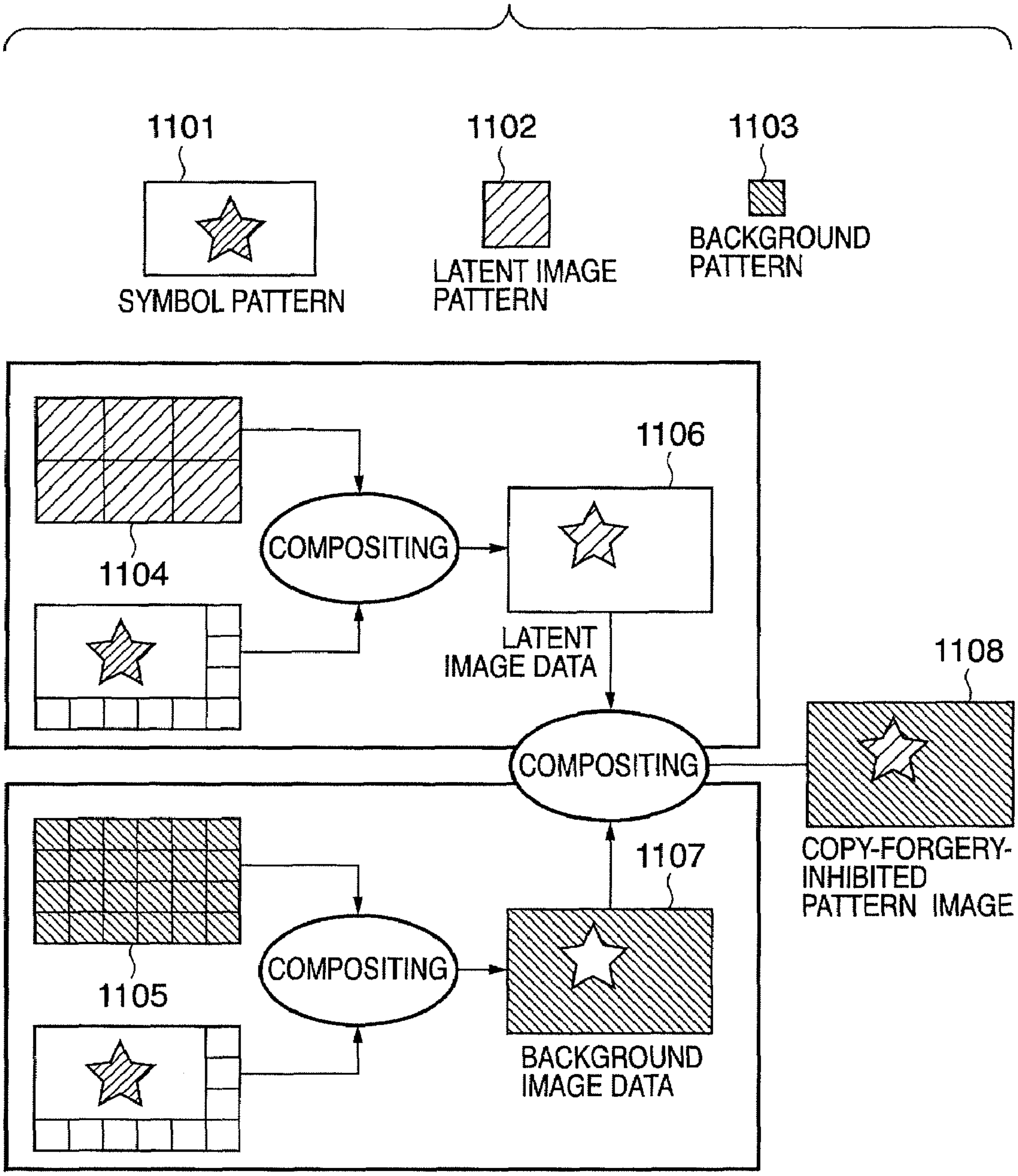
FIG. 11 describes a process flow when generating the copy-forgery-inhibited pattern image.

Flow of Process of Generating the Copy-Forgery-Inhibited Pattern Image (FIG. 11)

Following is a description of the process of composition the original image with the copy-forgery-inhibited pattern that is configured of the latent image and the background to generate the copy-forgery-inhibited pattern image, with reference to FIG. 11.

The bitmap data is generated in accordance with the information of the latent image that is directed by the user, such as "Top Secret", "Copy Inhibit", or the symbol information. A symbol pattern 1101 that is depicted in FIG. 11 depicts a concept of the bitmap data that is generated in accordance with the symbol information.

A latent image pattern 1102 and a background pattern 1103, both of which are bitmap data, are generated using a dither process.

The dither process is a known technology, and following is a description thereof, with reference to FIG. 12 through FIG. 15, with both a 4×4 dot concentrated dither matrix, per FIG. 12, and a 4×4 dot distributed dither matrix, per FIG. 13.

Figure 14:
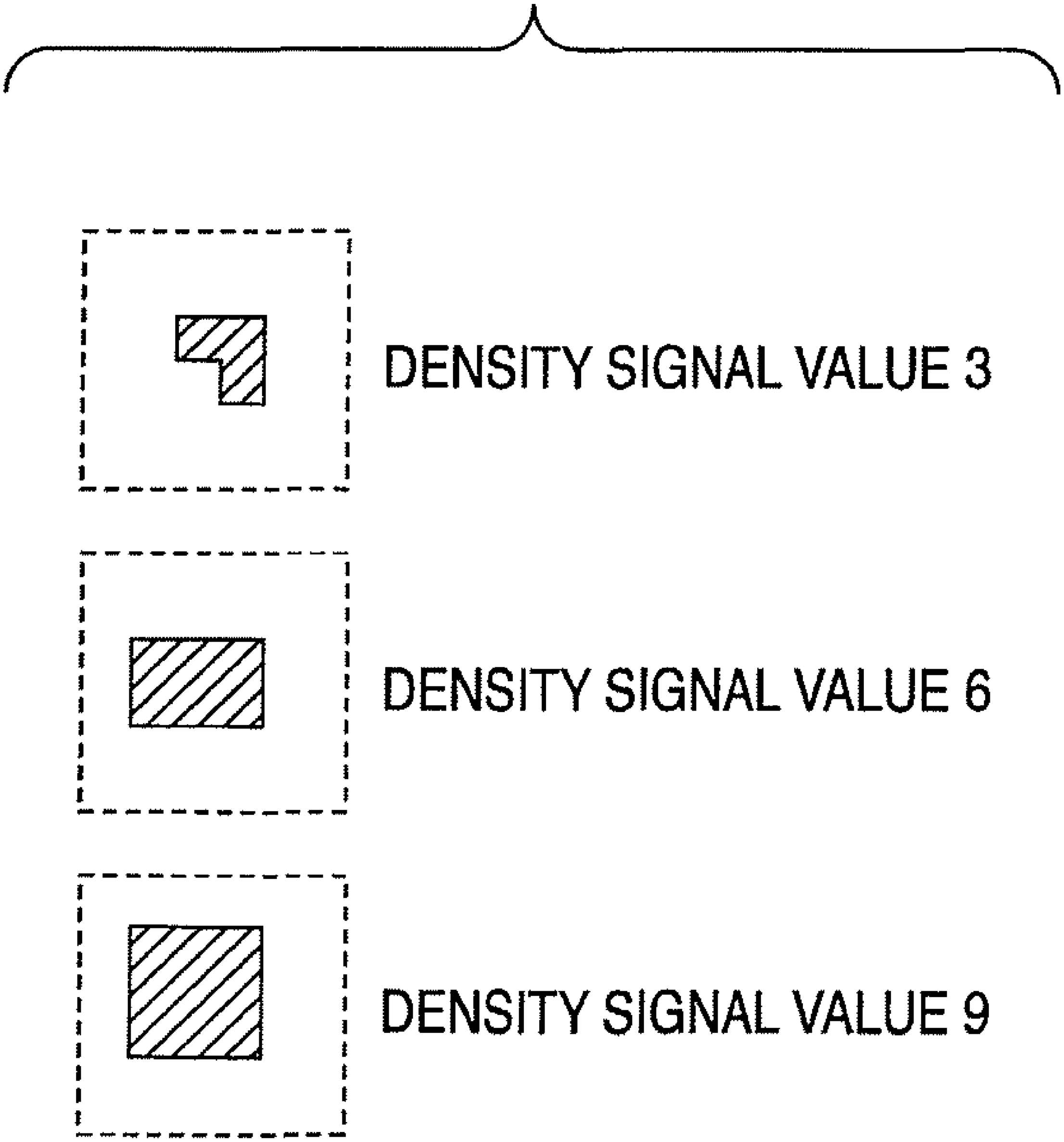
FIG. 14 depicts a dot pattern that is generated by applying a density signal value 3, 6, or 9 to the dot concentrated dither matrix that is depicted in FIG. 12.

FIG. 14 depicts a dot pattern that is generated by applying a density signal value 3, 6, or 9 to the dot concentrated dither matrix that is depicted in FIG. 12. A comparison of FIG. 12 with FIG. 14 will make apparent the fact that a dot is struck, i.e., on, in a pixel position wherein a value within the dot concentrated dither matrix that is depicted in FIG. 12 is less than or equal to the density signal.

Figure 15:
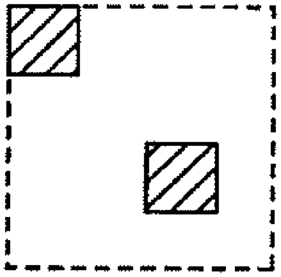
FIG. 15 depicts a dot pattern that is generated by applying a density signal value 2, 4, or 5 to the dot distributed dither matrix that is depicted in FIG. 13.
Figure 15:
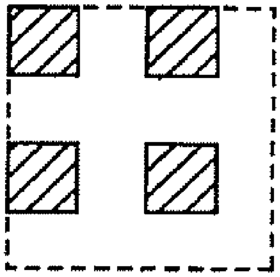
Figure 15:
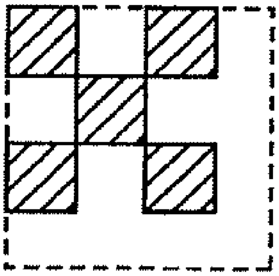

FIG. 15 depicts a dot pattern that is generated by applying a density signal value 2, 4, or 5 to the dot distributed dither matrix that is depicted in FIG. 13. A comparison of FIG. 14 with FIG. 15 shows that the dot pattern depicted in FIG. 14 is the concentrated dot pattern, while the dot pattern depicted in FIG. 15 is the distributed dot pattern.

The description of the dither process completed, the description returns to the process of generating the latent image pattern 1102 and the background pattern 1103.

A dither matrix for generating the latent image component ("latent image matrix") and a density signal value for generating the latent image component that is applied to the dither matrix are stored in the HDD 209. Also stored therein are a dither matrix for generating the background component ("background matrix") and a density signal value for generating the background component that is applied to the dither matrix.

When generating the latent image pattern 1102, the latent image matrix and the density signal value for generating the latent image component are read from the HDD 209. The density signal value for generating the latent image component that is thus read is applied to the latent image matrix, and the latent image pattern 1102 is thus generated. The background pattern 1103 is generated in similar fashion.

The latent image pattern 1102 and the background pattern 1103 are repeated a prescribed number of times to generate a latent image repeat pattern 1004 and a background repeat pattern 1105. A latent image data 1106 is generated from the latent image repeat pattern 1104 and the symbol pattern 1101. A background image data 1107 is generated in similar fashion. The latent image data 1106 and the background image data 1107 thus generated are composited to generate a copy-forgery-inhibited pattern image 1108.

The copy-forgery-inhibited pattern image 1108 is a duotone bitmap data. A color information within the CMK is also appended to the bitmap data. The color information may be determined by either a setting by the user or color information of the original image.

According to the first embodiment, the dither process is used to perform the generation of the copy-forgery-inhibited pattern image. The present invention is not limited thereto, however. It would also be permissible, however, to use the error diffusion technique or the average density technique for making the background pattern, for example.

Having described the image forming process of the image data with the copy-forgery-inhibited pattern attached, following is a description of a process of identifying an original document with the copy-forgery-inhibited pattern attached. The original document with the copy-forgery-inhibited pattern attached may be created with the digital multi-function peripheral that is depicted according to the first embodiment, or with a copy-forgery-inhibited pattern printing paper, whereupon the copy-forgery-inhibited pattern is laid out as a matter of course. The text within the copy-forgery-inhibited pattern is identified simultaneously with a portion of the process of digitizing the original image.

Process of Identifying Text Information Within the Copy-Forgery-Inhibited Pattern Following is a description of a process of identifying the copy-forgery-inhibited pattern that is contained in the original image, with reference to FIG. 16 and FIGS. 21 through 23. Each respective process in each respective flowchart is controlled overall by the CPU.

Figure 16:
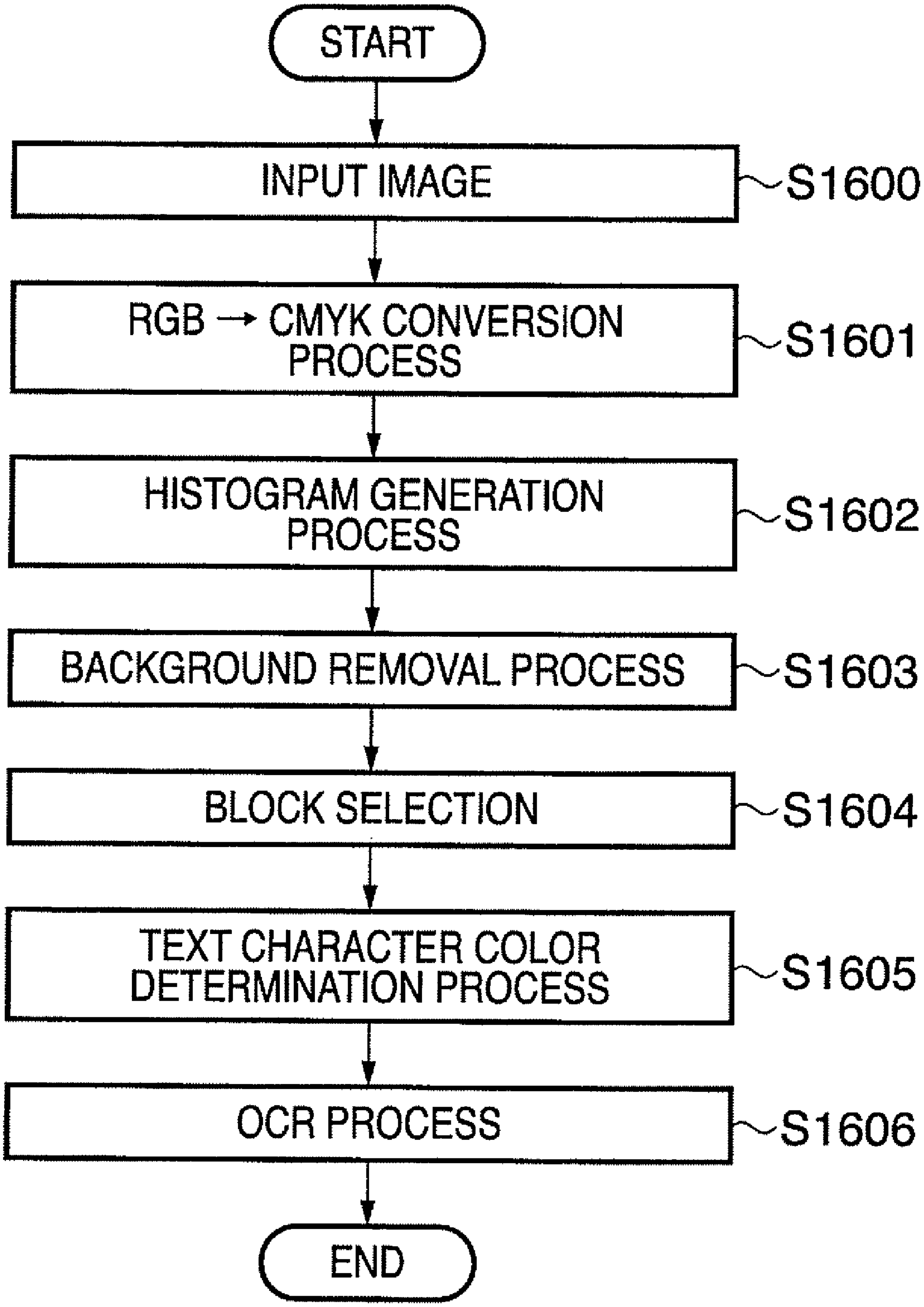
FIG. 16 is a flowchart depicting a conversion of a document into a digital file, according to the first embodiment.
Figure 17B:
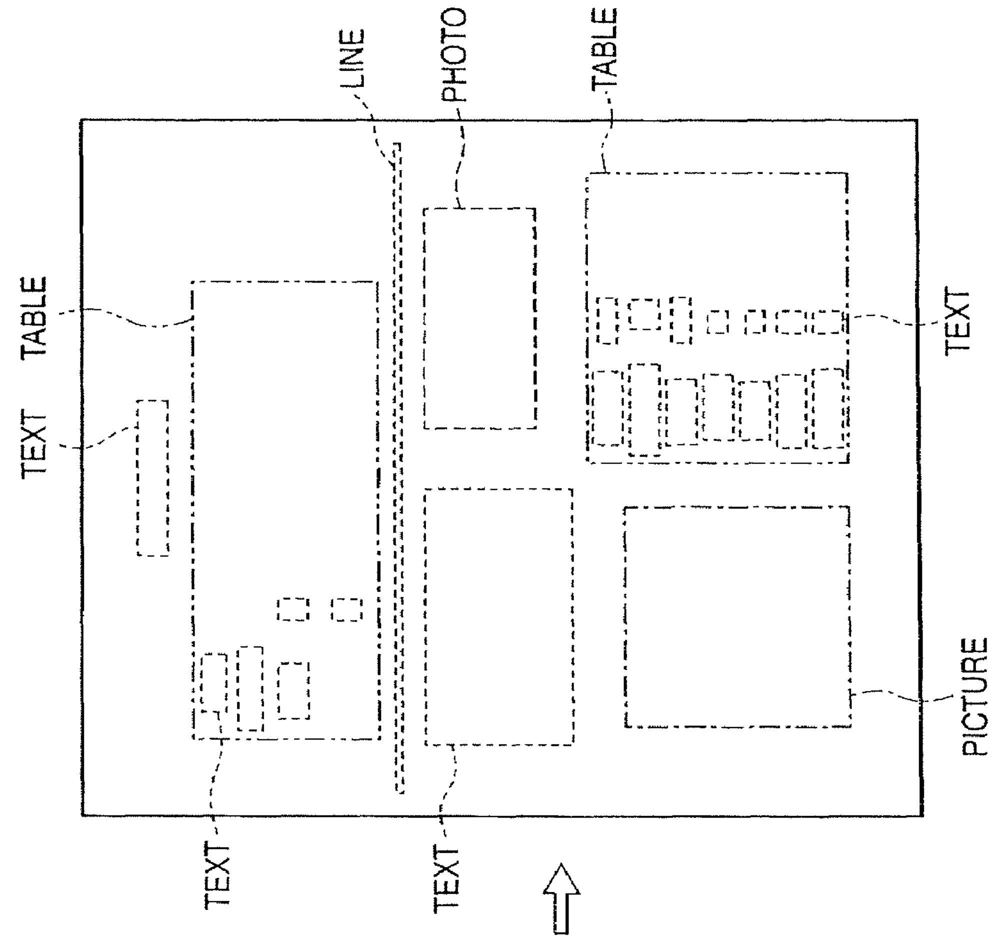
FIG. 17A and FIG. 17B describe a block selection process.
Figure 17A:
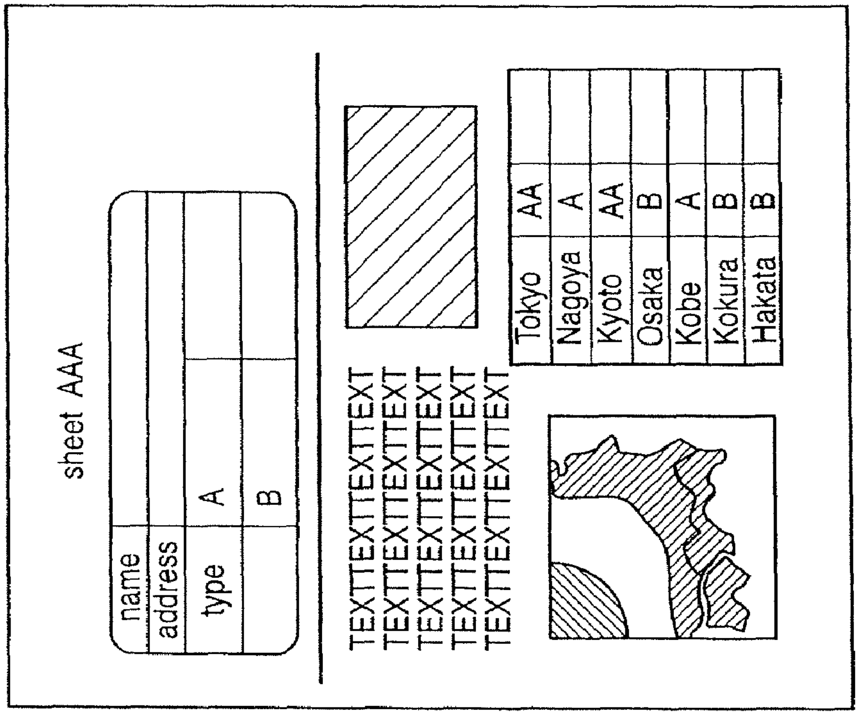

FIG. 16 depicts a pre-processing for finding the copy-forgery-inhibited pattern image. The pre-processing is executed by the overall control of the CPU. The image data is inputted as RGB in step S1600. A color conversion is performed on the inputted image data from RGB to CM in step S1601, because cyan and magenta are frequently used in the copy-forgery-inhibited pattern image. A histogram is generated from the post-CMY color converted image data in step S1602, meaning that a histogram is generated for each of C, M, and Y.

In step S1603, a background removal process is performed on the post-CMY color converted image data. The background removal process is a known process of removing light data. Given that each respective dot in the background component of the copy-forgery-inhibited pattern image is small, the dots are identified as light data when read in by the scanner, and thus, being light data, are removed by the background removal process. Following is a description of a reason why the dots in the background component are identified as light data when read in by the scanner.

The dots in the background component have a size on the order of approximately 42 micrometers by 42 micrometers, which is approximately the size of one pixel at a 600 dpi print resolution, and a scanner's unit of scanning is also on the order of approximately 42 micrometers by 42 micrometers, which is approximately the size of one pixel at a 600 dpi scan resolution. An inevitable phase shift results in the dots in the background component being distributed into four pixels and read in as such. Being thus distributed when being read in thus results in the per pixel data being read in as light data.

On the other hand, given that each respective dot in the latent image component of the copy-forgery-inhibited pattern image is larger, the dots are identified as dark data when read in by the scanner, and thus, being dark data, are unaffected by the background removal process. Following is a description of a reason why the dots in the latent image component are identified as dark data when read in by the scanner.

The dots in the latent image component have a size on the order of approximately 126 micrometers by 126 micrometers, which is approximately the size of a 3×3 pixel arrangement at a 600 dpi print resolution, whereas a scanner's unit of scanning is also on the order of approximately 42 micrometers by 42 micrometers, which is approximately the size of one pixel at a 600 dpi scan resolution. It is thus possible for the dots in the latent image component to be distributed into 16 pixels, in a 4×4 arrangement, and read in as such. Given, however, that there is little distributing when reading in the data, the per pixel data is read in as dark data.

The image data that is obtained by the background removal process as per the foregoing in step S1603 erases the dots in the background component, leaving the dots in the latent image component.

Step S1604 performs a block selection process on the post-background removal process image data. The block selection process partitions the image data into a character string block and a non-character string block. Put another way, the block selection process extracts the character string block from the image data.

The block selection process extracts a given character as a character string block if there is no other character near the given character. If there is another character near the given character, on the other hand, a character string containing both the given character and the other character is extracted as the character string block.

The block selection process thus extracts the character string containing a plurality of adjacent characters, the respective distance therebetween being within a prescribed distance, as a character string block. As an exception, if no other character is present within the prescribed distance, the single character is extracted as the character string block. Information that is attached as the copy-forgery-inhibited pattern image is commonly made up of such character strings as “Void” or “Copy Inhibit”, thus making it desirable to extract based on the unit of the character string, rather than the unit of the individual text character.

According to the embodiment, it is possible to set the character string, such as “Void” or “Copy Inhibit” in the screen that is described in FIG. 9. The font information thereof is stored in a copy-forgery-inhibited pattern text storage unit, wherein the user may enter an arbitrary character string as a copy-forgery-inhibited pattern.

When a character string contained in the original document is found to match with the character string in the copy-forgery-inhibited pattern text storage unit, it is possible to determine that the original document contains the copy-forgery-inhibited pattern.

The block selection process calculates the number of character string blocks, assigning the result to a variable n.

Step S1605 performs a process of determining a color of the text for the region that is determined by the block selection to be a character string block. The result of the determination of the color of the text will be employed hereinafter.

Step S1606 performs a text identification process and a text size determination process for the region that is determined by the block selection to be a character string block. The text identification result, i.e., a character code, and the text size determination result are linked to the text color and stored and managed on a per block basis in the RAM 207.

All of the blocks are read in, in step S2101. In step S2102, a variable k is set equal to 1.

In step S2103, a determination is made as to whether or not k=n. If k does equal n, the process proceeds to step S2201. If k does not equal n, the process proceeds to step S2104.

Step 2104 assigns the kth character string block for processing. Step S2105 determines whether or not the kth character string block contains a text character that is greater than or equal to a prescribed size. If the text character that is greater than or equal to the prescribed size is present, the process proceeds to step S2106. If, on the other hand, the text character that is greater than or equal to the prescribed size is not present, the process proceeds to step S2108. Processing thus continues for a character string block with a large character size, because it is expected that the size of the character string that is appended as the copy-forgery-inhibited pattern image is going to be in a large, eye-catching type.

Step S2106 determines whether or not the kth character string block contains at least a prescribed number of characters. If at least the prescribed number of characters is present, the process proceeds to step S2108. If, on the other hand, at least the prescribed number of characters is not present, the process proceeds to step S2107. Processing thus continues for a character string block with a low number of characters, because it is expected that the number of characters in the character string that is appended as the copy-forgery-inhibited pattern image is going to be a low number, such as “VOID” or “Copy Inhibit”.

Step S2107 assigns the kth character string block as a candidate block, and the process proceeds to step S2108, wherein k is incremented by one. The process then proceeds to step S2103. The foregoing process assembles the candidate blocks, whereupon the process proceeds to step S2201.

Step S2201 compares the histogram that was generated in step S1602 with each respective candidate block, and extracts the block that matches the histogram. A specific breakdown of the process flow in step S2201 is as follows.

A color, i.e., C, M, or Y, which is present in the histogram at not less than a prescribed value is retrieved, and is set to the color of the copy-forgery-inhibited pattern image. If C is the only color that is present at not less than the prescribed value, then the color of the copy-forgery-inhibited pattern image is set to C. If M is the only color that is present at not less than the prescribed value, then the color of the copy-forgery-inhibited pattern image is set to M. If Y is the only color that is present at not less than the prescribed value, then the color of the copy-forgery-inhibited pattern image is set to Y. If all of the colors C, M, and Y are present at not less than the prescribed value, then the color of the copy-forgery-inhibited pattern image is set to K. In other instances, the process is interrupted.

The block of the same color as the copy-forgery-inhibited pattern image thus set is extracted from the candidate blocks. The reason for extracting the block in the histogram in the present step is that examining the histogram allows determining the color of the copy-forgery-inhibited pattern image. Put another way, the reason is that the copy-forgery-inhibited pattern image has a significant effect on the histogram. The copy-forgery-inhibited pattern image is typically composited into a full sheet of printing paper. Thus, the copy-forgery-inhibited pattern image color is uniform across the entire sheet of printing paper, i.e., light C, light M, light Y, or light K. Accordingly, the copy-forgery-inhibited pattern image possesses the same color across the entire sheet of printing paper. Hence, the copy-forgery-inhibited pattern image has a significant effect on the histogram.

Upon completion of the foregoing, the process proceeds to step S2202.

In step S2202, all of the candidate blocks that were extracted in step S2201, i.e., all of the character string blocks that match the histogram, are read in. In step S2203, the first block of the blocks thus read in is assigned for processing.

In step S2204, a determination is made as to whether or not any candidate blocks remain to be processed. If it is determined that no candidate blocks remain to be processed, the process proceeds to step S2301. If, on the other hand, it is determined that candidate blocks do remain to be processed, the process proceeds to step S2205.

In step S2205, a determination is made as to whether or not another candidate block is present that has a character string that is identical to the character string in the candidate block. If a matching candidate block is determined to be present, the process proceeds to step S2206. If, on the other hand, a matching candidate block is determined to not be present, the process returns to step S2204. Put another way, the process of step S2205 retrieves a candidate block that has a character string that is identical to the character string in another candidate block.

In step S2206, the candidate block that is targeted for processing and the other candidate blocks that have a character string that is identical to the character string in the candidate block that is targeted for processing are treated as final candidate blocks. When the process herein is completed, the process returns to step S2204.

Upon completion of the foregoing, the final candidate blocks are assembled, and the process proceeds from step S2204 to step S2301.

In step S2301, an identification of a positional relationship of all of the final candidate blocks is performed, and a position table is created as a result of the identification. In step S2302, a determination is made, in accordance with the position table thus created, as to whether or not the placement of the final candidate blocks is regular. In particular, the position of the final candidate blocks is determined to be regular if a first, second, third, and fourth character string block exist that satisfy the following formula:

$$(X2-X1, Y2-Y1) \approx (X4-X3, Y4-Y3)$$

The formula signifies that the distance between each x and y coordinate of the first block (X1, Y1) and the second block (X2, Y2) are substantially the same as the distance between each x and y coordinate of the third block (X3, Y3) and the fourth block (X4, Y4). The reason for determining whether or not the placement is regular in such a manner is that the character string in the copy-forgery-inhibited pattern image is typically arranged in a regular fashion.

If it is determined that the character string is arranged in a regular fashion, the process proceeds to step S2303, wherein it is determined to be a copy-forgery-inhibited pattern, whereas if is determined that the character string is not arranged in a regular fashion, the process proceeds to step S2304, wherein it is determined to not be a copy-forgery-inhibited pattern.

Illustrative Example

Following is an illustration of the process from step S1603 to step S2304.

Figure 18:
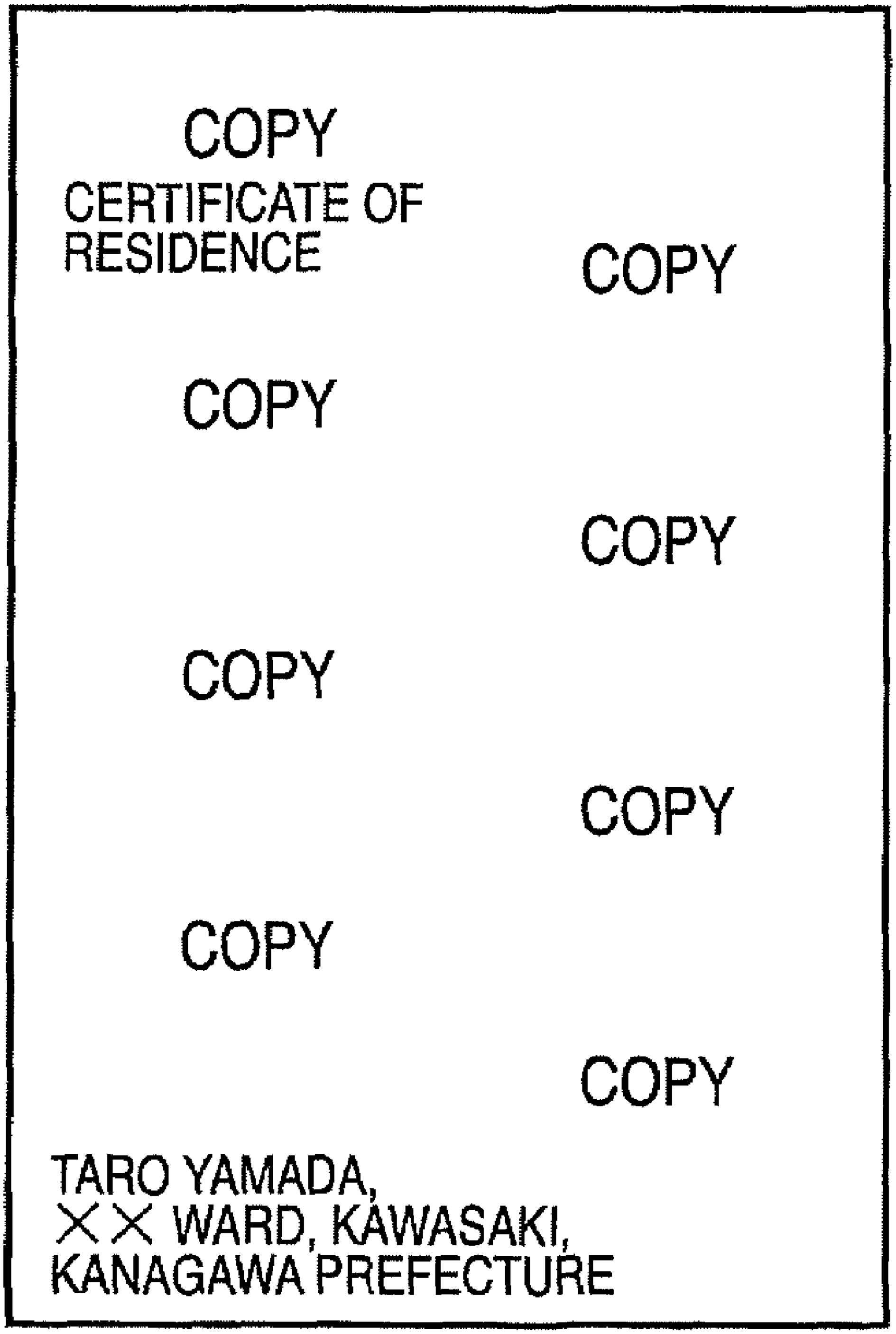
FIG. 18 depicts an example of a source image including the copy-forgery-inhibited pattern image.
Figure 19:
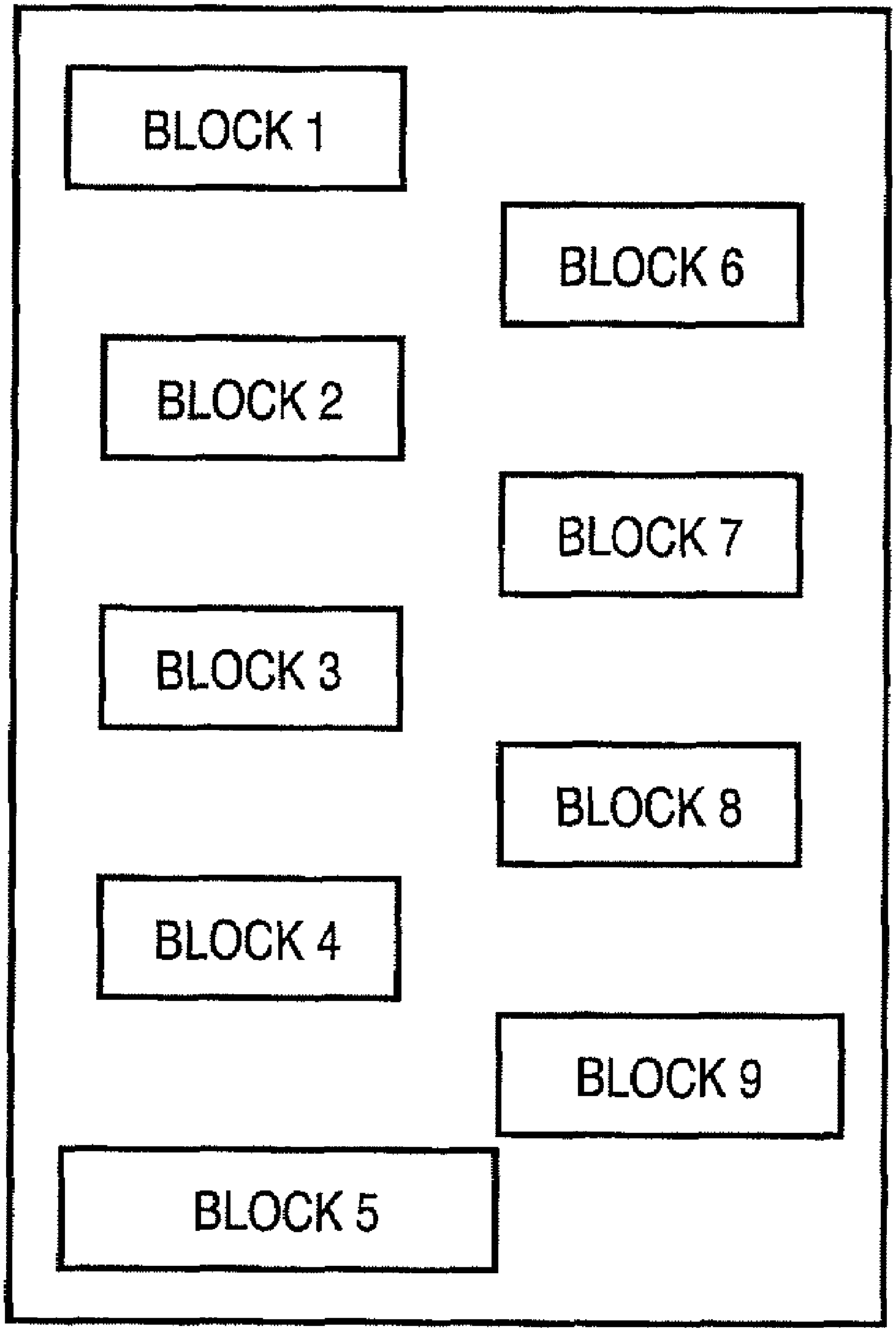
FIG. 19 depicts a result of the block selection process.

It is presumed that the image data that is depicted in FIG. 18 is obtained by the background removal process in step S1603. The sections marked "COPY" in the image data are colored cyan, while the name and address sections are colored black, and the "Certificate of Residence" section is colored red. The block selection process in step S1604 then extracts character string blocks 1 through 9, as depicted in FIG. 19.

The text color determination process in step S1605 identifies the character string blocks 2 through 4, and 6, as cyan, the character string block 1 as black, i.e., cyan and red, and the character string block 5 as black as well.

The OCR process is performed in step S1606, identifying the character string block 1 as "Certificate of Residence COPY" the character string blocks 2 through 4 and 6 through 9 as "COPY" and the character string block 5 as "Taro Yamada, _ Ward, Kawasaki, Kanagawa Prefecture".

The results of the processes in steps S2101 through S2107 identify the character string blocks 1 through 4 and 6 through 9 as candidate blocks. The character string block 5 is excluded from the candidate blocks by way of the process in step S2105, i.e., are the characters not less than a prescribed size?

The process in step S2201 excludes the character string block 1 from the candidate blocks, because it is colored black, whereas cyan is the color that matches the histogram.

Of the remaining character string blocks 2 through 4 and 6 through 9, the processes in steps S2201 through S2301 determine whether or not the character strings are identical; all of the character string blocks qualify, because all of the character string blocks contain the character string "COPY".

The position, i.e., coordinate, identification in step S2301 is performed on all of the character string blocks, and the results of the processing thereof is converted to a table such as that depicted in FIG. 20.

A determination is made in step S2302 as to whether or not each respective block is positioned equidistant to the blocks that surround it, on both the x and y axes. When it is determined that the blocks with the identical character string, "COPY" are determined to appear regularly, i.e., periodically, and thus, to possess regularity, i.e., periodicity, the original document is thus determined to have the copy-forgery-inhibited pattern image attached thereto, per step S2303. On the other hand, when it is determined that the blocks with the identical character string, "COPY" do not possess regularity, i.e., periodicity, the original document is thus determined to not have the copy-forgery-inhibited pattern image, as per step S2304.

It is also permissible to determine the presence, or lack thereof, of the copy-forgery-inhibited pattern image by storing character strings in memory that are frequently contained in the copy-forgery-inhibited pattern image, such as "COPY", "DUPLICATE", or "Copy Inhibit", and comparing the character strings in memory with the character strings in the original document, rather than determining the periodicity of similar text.

Figure 21:
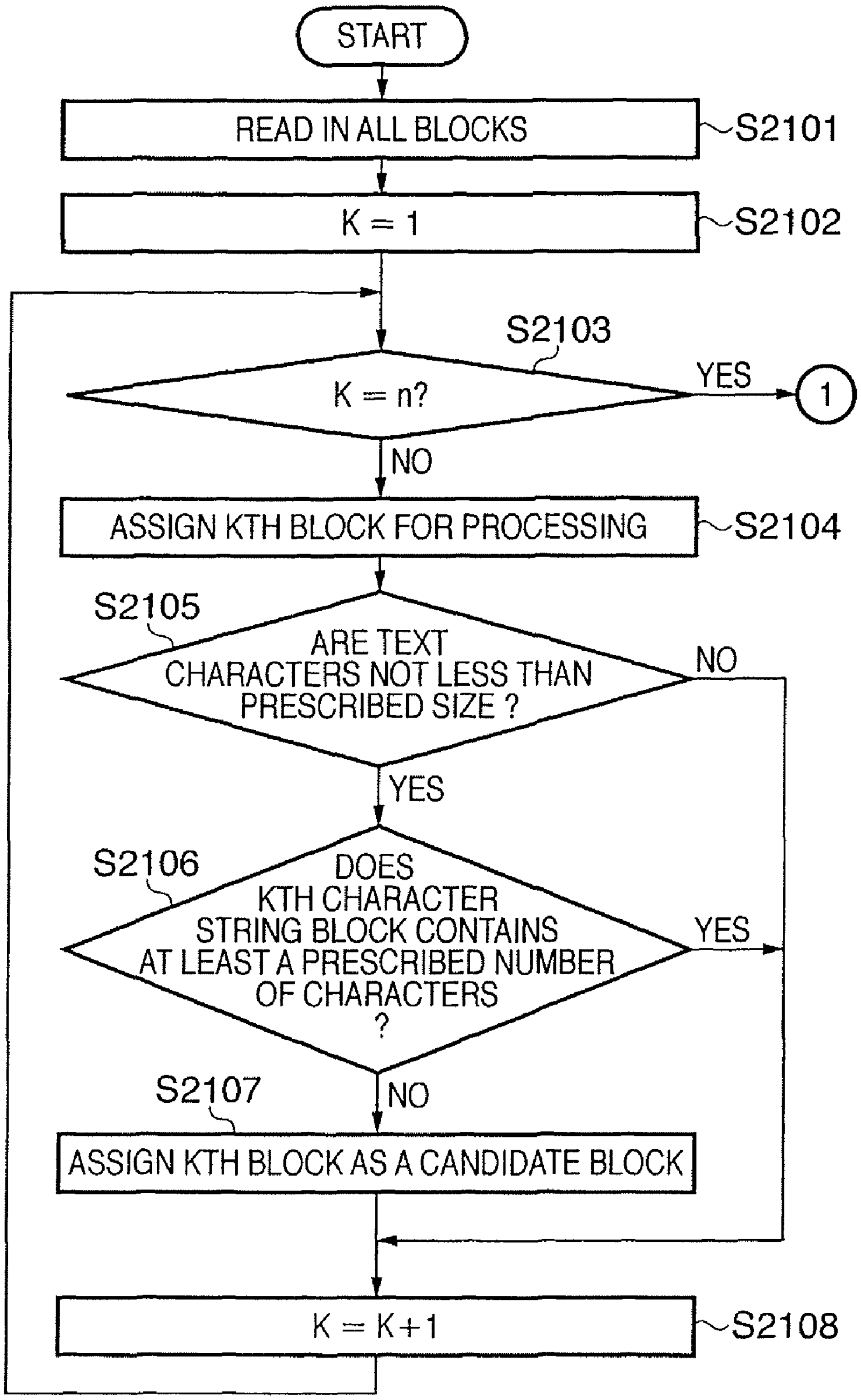
FIG. 21 is a flowchart depicting a copy-forgery-inhibited pattern determination, according to the first embodiment.
Figure 22:
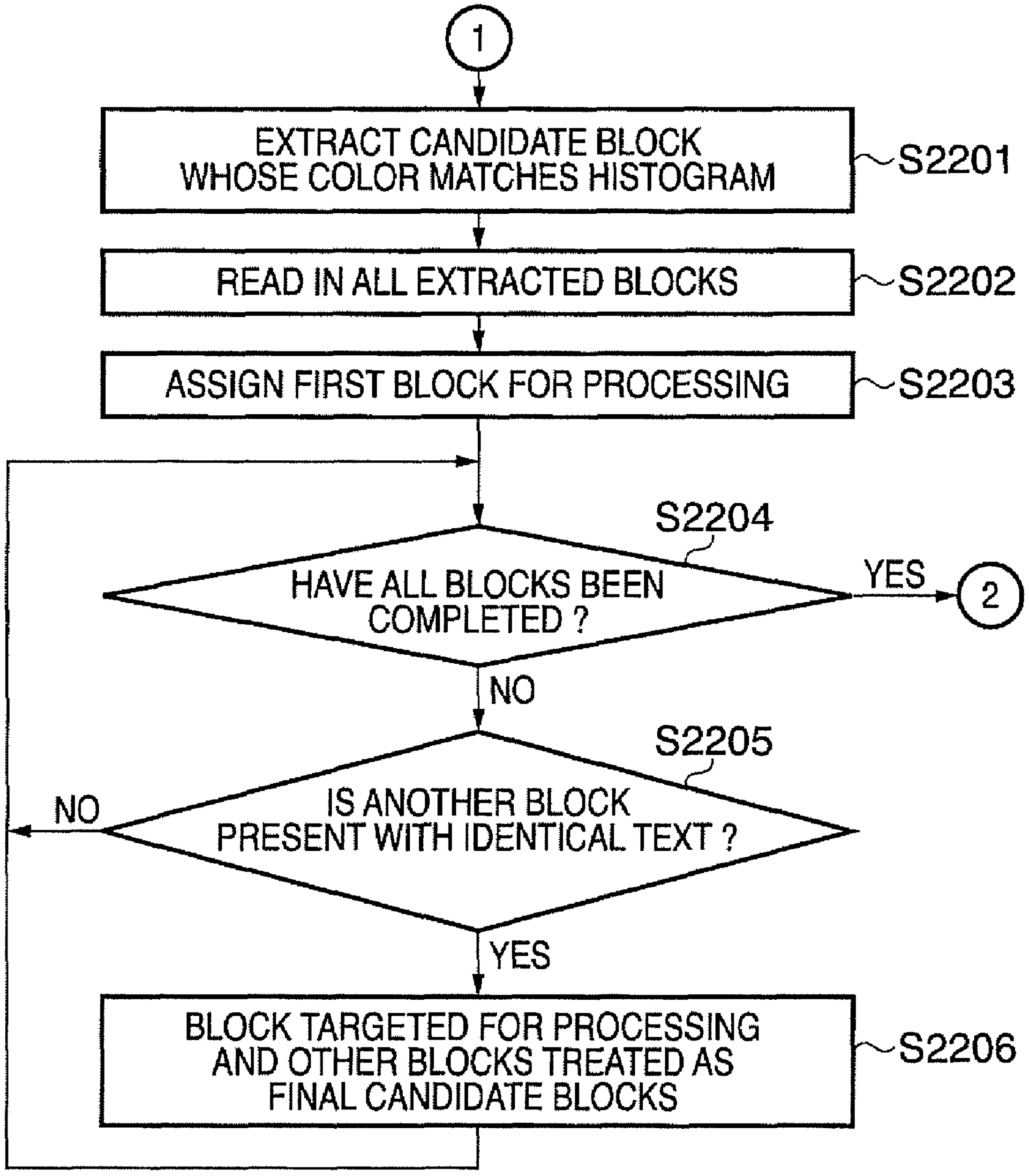
FIG. 22 is a flowchart depicting a copy-forgery-inhibited pattern determination, according to the first embodiment.
Figure 23:
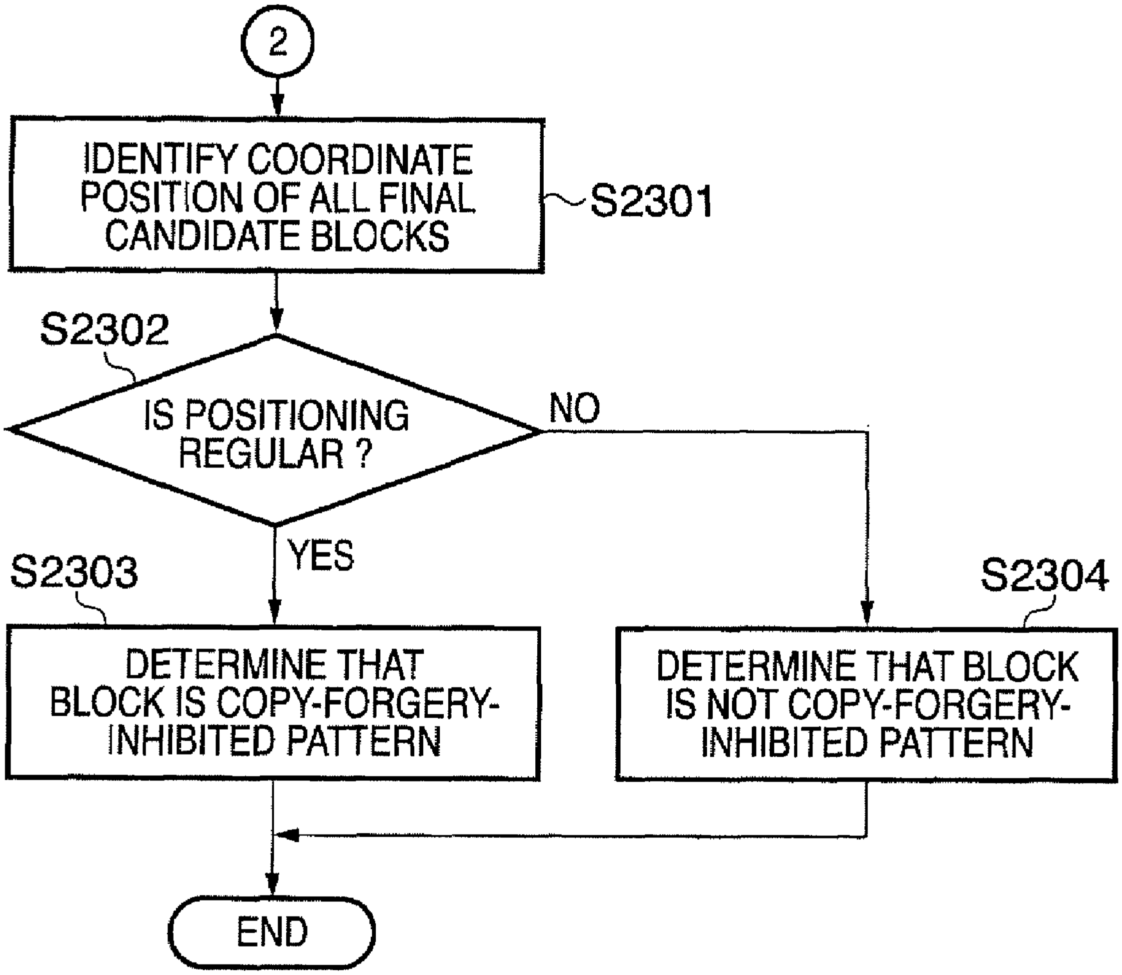
FIG. 23 is a flowchart depicting a copy-forgery-inhibited pattern determination, according to the first embodiment.
Figure 24:
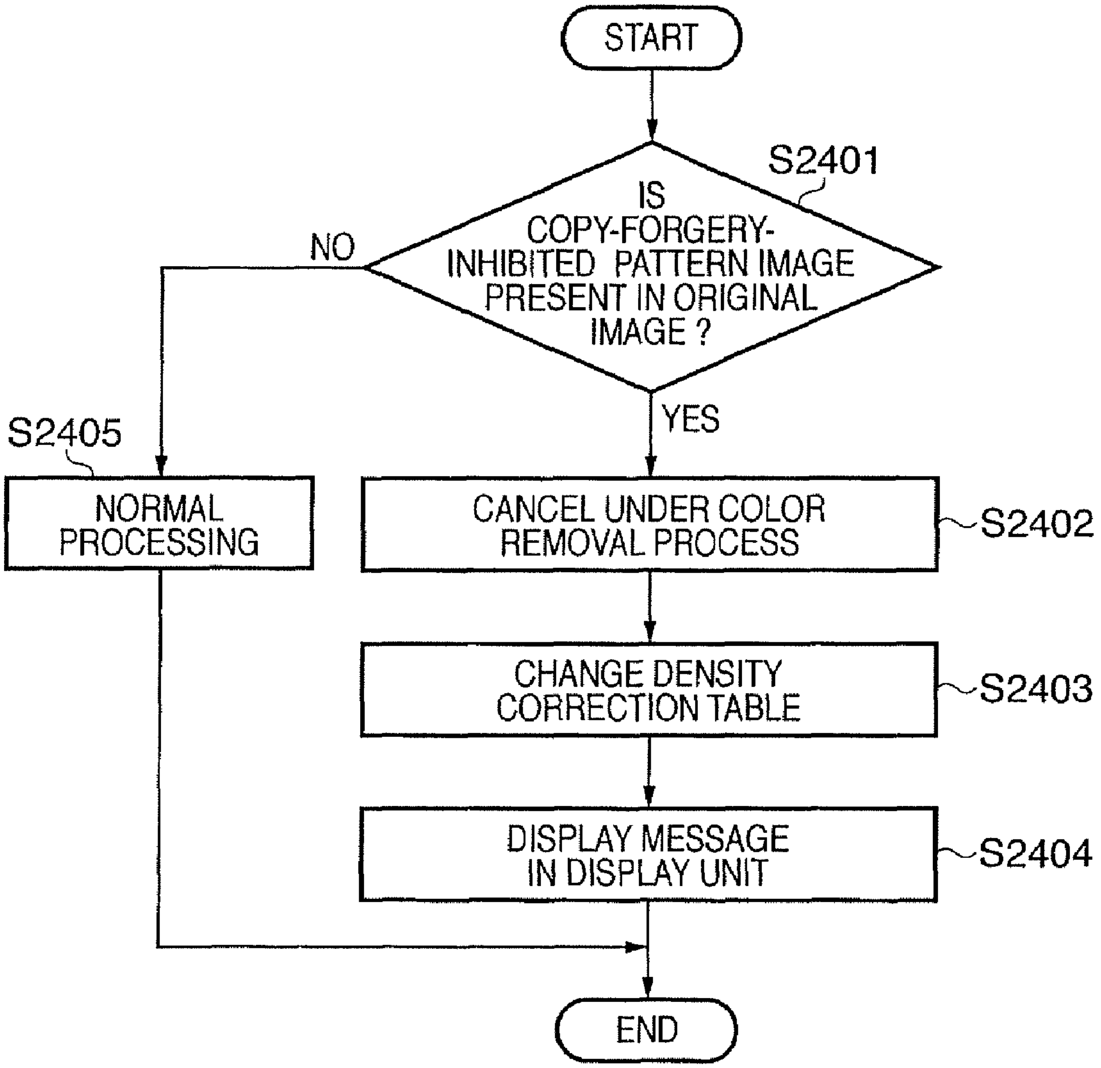
FIG. 24 is a flowchart depicting a process of changing an under color removal function and a density correction function when the copy-forgery-inhibited pattern image is present.

As is apparent from the flowcharts depicted in FIG. 21 through FIG. 23, a determination as to whether or not the text is less than a prescribed size, as well as whether or not the text is greater than a prescribed number of characters, is performed according to the embodiment prior to the determination as to whether or not the character strings are laid out regularly, i.e., periodically. The objective in doing so is to reduce the number of target character strings, i.e., text blocks, prior to the determination of periodicity. The reason for placing the determination of periodicity process after the other determination processes is that the determination of periodicity process takes a very long time, compared to the other determination processes.

For example, determining periodicity for 100 character strings would require 100C4=100×99×98×97/(4×3×2×1)=3, 922,125 processing cycles, an inordinately large volume of calculation.

While the foregoing presumes a configuration that performs the copy-forgery-inhibited pattern determination with dedicated blocks, it would also be permissible to employ the CPU 203 to perform a similar process.

Restriction 1 on Processing, Imposed by the Result of The Copy-Forgery-Inhibited Pattern Determination Following is a description of a process of changing the function of the digital multi-function peripheral in response to the results of the copy-forgery-inhibited pattern determination, with reference to FIG. 24 through FIG. 27.

If the copy-forgery-inhibited pattern image is present, a setting is performed so as not to carry out the background removal. A density correction function is set to a prescribed level. The process is described in FIG. 24. The result of the copy-forgery-inhibited pattern determination process is verified in step S2401. If no copy-forgery-inhibited pattern image is present in the original document, the process proceeds to step S2405, and the process proceeds as normal, wherein the image data post background removal processing in step S1603 is printed out.

Figure 25:
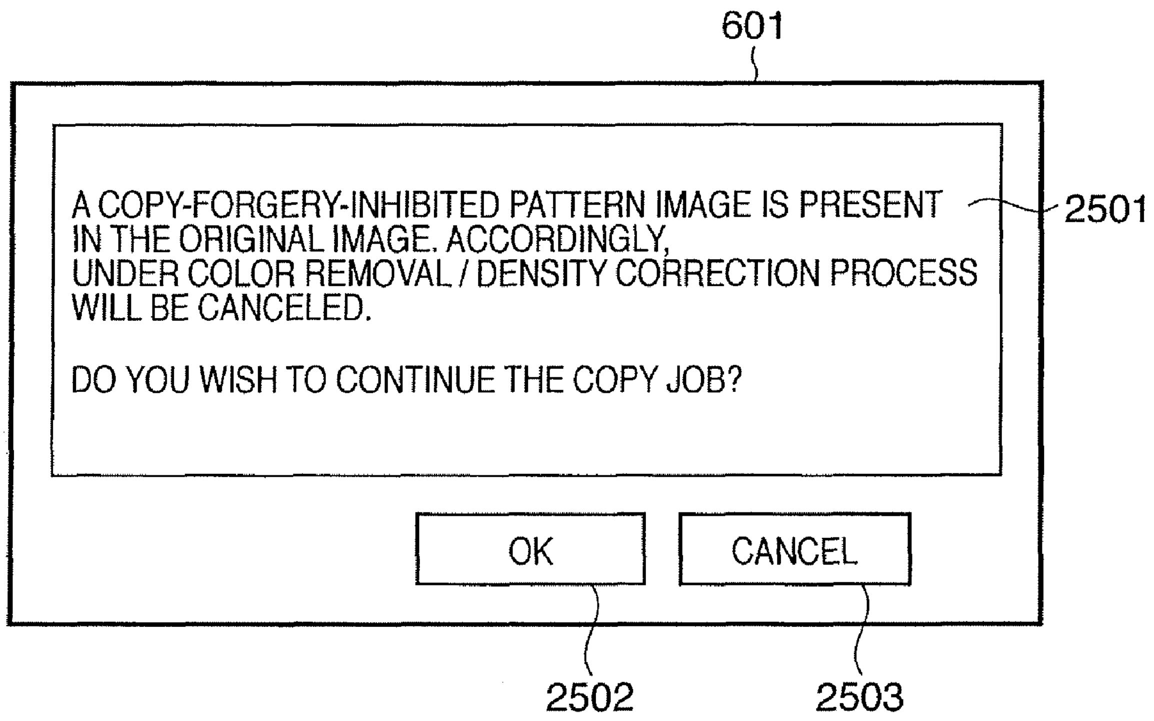
FIG. 25 depicts an example of a screen of a message concerning changing the under color removal function and the density correction function.

If, on the other hand, the copy-forgery-inhibited pattern image is present in the original document, the process proceeds to step S2402, wherein the background removal process is canceled, followed by a density correction table being set in step S2403 to a level, the value whereof will not erase the copy-forgery-inhibited pattern image. Step 2404 performs a user notification by displaying a message in the LCD control panel 601, such as a message screen 2501, as depicted in FIG. 25.

If the user depresses an OK tab 2502, the copy job continues, whereas the copy job is canceled if the user instead depresses a cancel tab 2503. If the copy job continues, the image data prior to the performance of the background removal process will be printed out.

Figure 26:
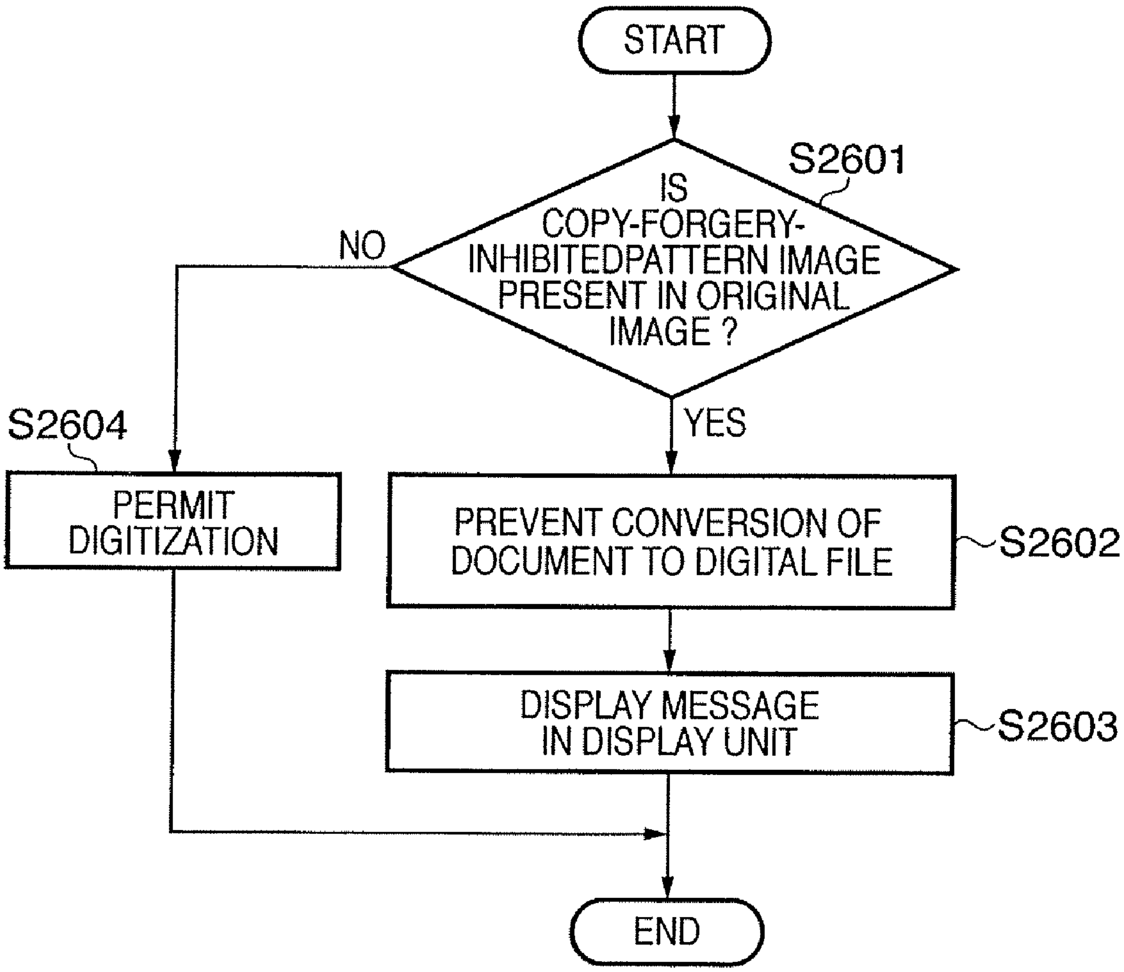
FIG. 26 is a flowchart depicting a process of canceling the conversion of the document into the digital file when the copy-forgery-inhibited pattern image is present.

Restriction 2 on Processing, Imposed by the Result of The Copy-Forgery-Inhibited Pattern Determination FIG. 26 is a flowchart depicting a process of canceling the conversion of the document into the digital file when the copy-forgery-inhibited pattern image is present. That the user has given a command for the conversion of the document into the digital file prior to the commencement of the process in the flowchart goes without saying.

In the flowchart, the result of the copy-forgery-inhibited pattern determination process is verified in step S2601. If no copy-forgery-inhibited pattern image is present in the original document, the process proceeds to step S2604, wherein the conversion of the document into the digital file is authorized, and the conversion of the document into the digital file is performed according to the process of the conversion of the document into the digital file.

Figure 27:
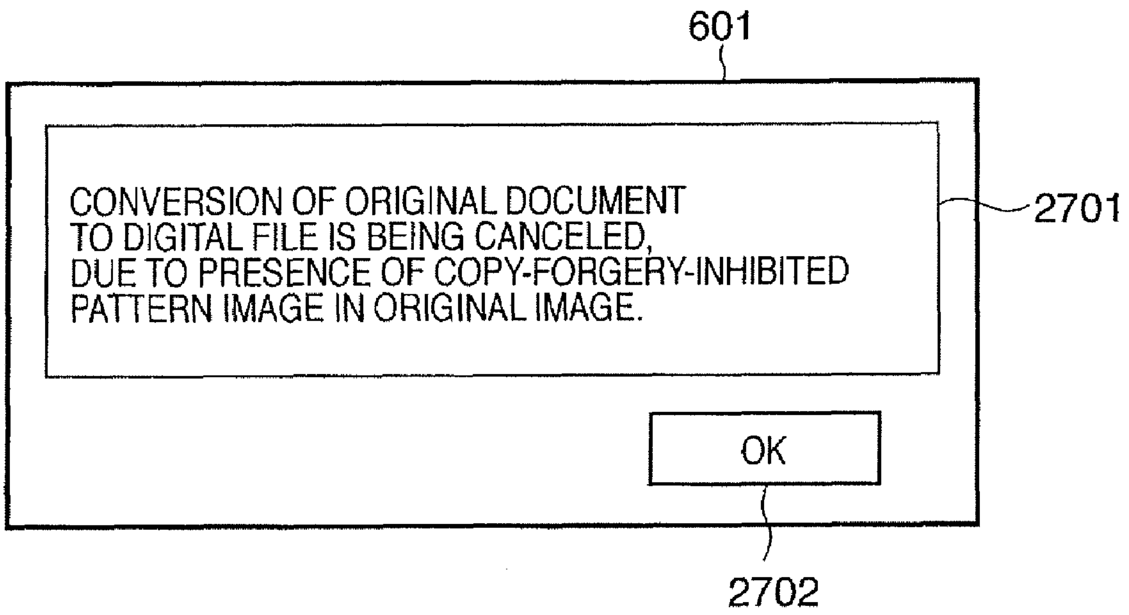
FIG. 27 depicts an example of a screen of a message concerning canceling the conversion of the document into the digital file.

If, on the other hand, the copy-forgery-inhibited pattern image is present in the original document, the process proceeds to step S2602, wherein the conversion of the document into the digital file is negated. Step 2603 performs a user notification by displaying a message in the LCD control panel 601, such as a message screen 2701, as depicted in FIG. 27. If the user depresses an OK tab 2701, the conversion of the document into the digital file is canceled.

Restriction 3 on Processing, Imposed by the Result of the Copy-Forgery-Inhibited Pattern Determination Restriction 2 on Processing, Imposed by the Result of The Copy-Forgery-Inhibited Pattern Determination, disclosed the process of canceling the conversion of the document into the digital file when the copy-forgery-inhibited pattern image is present. In the present example, the conversion of the document into the digital file is performed whether or not the copy-forgery-inhibited pattern image is present. If the copy-forgery-inhibited pattern image is present, however, a copy-forgery-inhibited pattern attribute is appended as the digital file. If the copy-forgery-inhibited pattern image is not present, a non-copy-forgery-inhibited pattern attribute is appended as the digital file. Management of the digital file is thus made easier, by appending the copy-forgery-inhibited pattern or the non-copy-forgery-inhibited pattern information as the attribute, i.e., the header information.

For example, when one wants to differentiate between a critical and a non-critical document, it is easy to manage documents by treating documents with the copy-forgery-inhibited pattern attribute present as critical, and documents with the non-copy-forgery-inhibited pattern attribute present as non-critical. As another example, when one wants to differentiate between a confidential and a non-confidential document, it is easy to manage documents by treating documents with the copy-forgery-inhibited pattern attribute present as confidential, and documents with the non-copy-forgery-inhibited pattern attribute present as non-confidential.

It is possible to prevent misappropriation of confidential or critical information by allowing only displaying of documents with the copy-forgery-inhibited pattern attribute present, and printing out of documents with the non-copy-forgery-inhibited pattern attribute present. It is thus desirable to have a switching unit adapted to switch the method of processing the image, depending on the type of copy-forgery-inhibited pattern attribute that is present.

Restriction 4 on Processing, Imposed by the Result of the Copy-Forgery-Inhibited Pattern Determination When copying an original document that has the copy-forgery-inhibited pattern attached thereto, a character string such as "VOID" typically appears. If an ill-intentioned user scans the original document and re-composites the copy-forgery-inhibited pattern with the same copy-forgery-inhibited pattern, i.e., the copy-forgery-inhibited pattern with each respective dot in the same placement position, an original document with the re-composited copy-forgery-inhibited pattern is created as a result.

Figure 33:
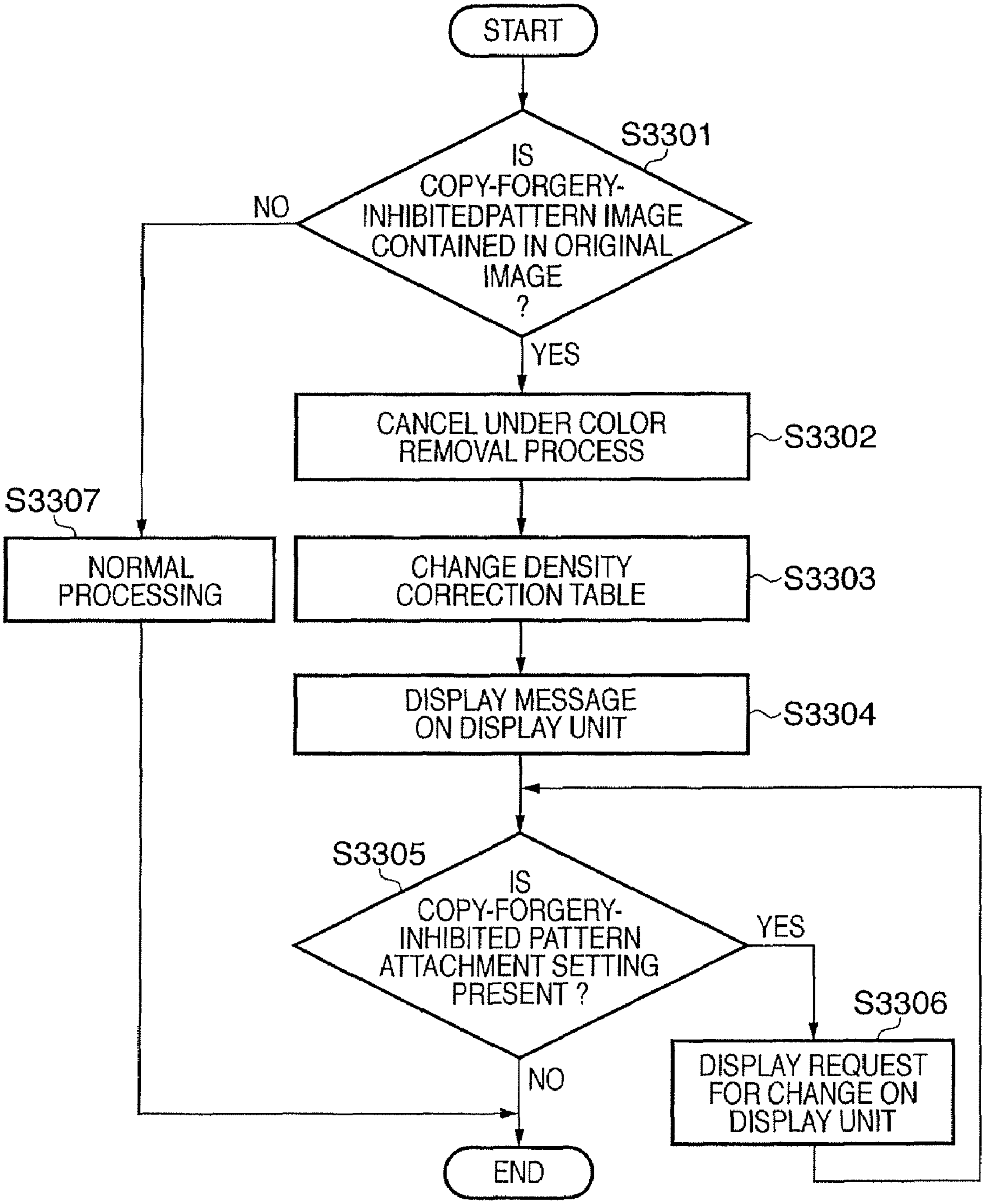
FIG. 33 is a flowchart depicting a process of changing a copy-forgery-inhibited pattern attachment setting when it is determined that the original document is the copy-forgery-inhibited pattern image.

FIG. 33 is a flowchart depicting a process of preventing an ill-intentioned user from attempting to copy an original document that has the copy-forgery-inhibited pattern attached thereto, and thus create an original document that has the copy-forgery-inhibited pattern attached thereto.

In concrete terms, the flowchart in FIG. 33 depicts a process of changing a copy-forgery-inhibited pattern attachment setting when it is determined that the original document is the copy-forgery-inhibited pattern image, and that the copy-forgery-inhibited pattern has been set.

Step S3301 determines whether or not the original document contains the copy-forgery-inhibited pattern image. If the original document contains the copy-forgery-inhibited pattern image, the process proceeds to step S3302, wherein the under color removal process is canceled. A change of the density correction table is performed in step S3303, a message such as that depicted in FIG. 25 is displayed in step S3304.

Figure 34:
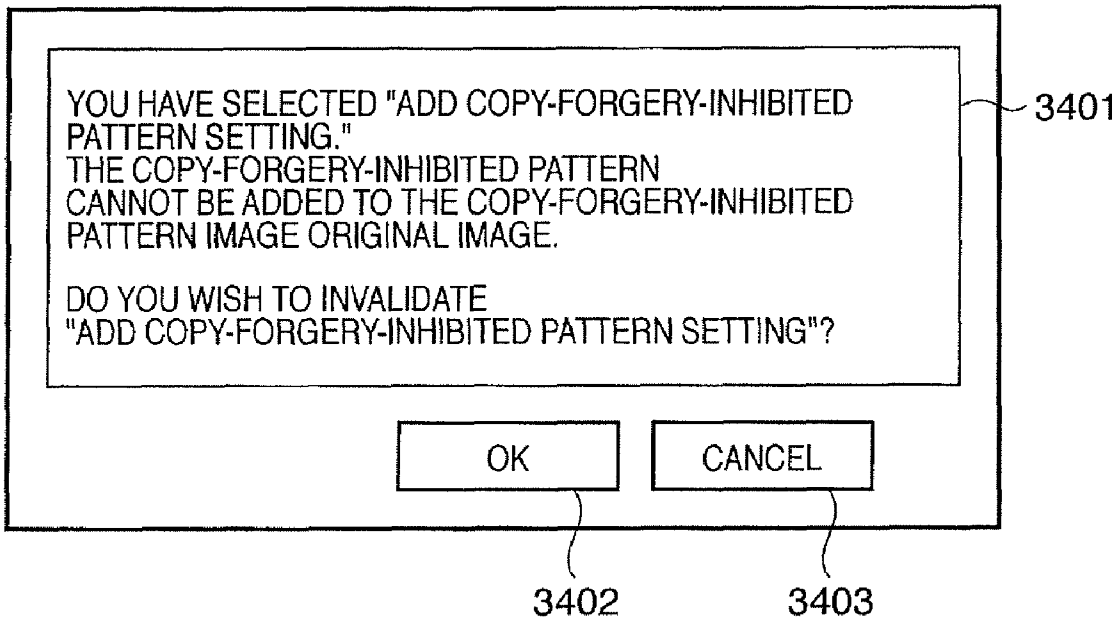
FIG. 34 depicts an example of a screen of a message concerning requesting that the copy-forgery-inhibited pattern attachment setting be invalidated.

Step S3305 determines whether or not the copy-forgery-inhibited pattern attachment setting is performed in the device setting. If the copy-forgery-inhibited pattern attachment setting is performed, a user notification is performed by displaying, in the LCD control panel 601, for example, a setting change request screen 3401 as depicted in FIG. 34.

If the user depresses an OK tab 3402, the copy-forgery-inhibited pattern attachment setting is negated, and the copy job continues. If the user depresses a cancel tab 3403, the copy job is canceled.

If, on the other hand, the original document does not contain the copy-forgery-inhibited pattern image in step S3301, the process proceeds to step S3307, wherein the process proceeds as normal.

According to the first embodiment, it is possible to identify the character string in the copy-forgery-inhibited pattern that is attached to the original document, detect the presence of the copy-forgery-inhibited pattern that contains the character string, and either process under color removal processing and density correction processing for the original image, or cancel the conversion of the document into the digital file. It is accordingly possible to keep to a minimum undesirable copying of the original image that contains the copy-forgery-inhibited pattern.

Second Embodiment

Following is a detailed description of a second embodiment according to the present invention, with reference to the attached drawings. The second embodiment controls the placement position of the dots that configure the copy-forgery-inhibited pattern image with regard to the process of generating the copy-forgery-inhibited pattern image, as described according to the first embodiment. The copy-forgery-inhibited pattern image is identified as being attached by the positioning of the dots of the copy-forgery-inhibited pattern image.

Other fundamental copy-forgery-inhibited pattern attachment processing is identical to the copy-forgery-inhibited pattern attachment processing according to the first embodiment, as described in FIG. 11. According to the second embodiment, the process of identifying the original document with the copy-forgery-inhibited pattern attached, as described according to the first embodiment, involves identification of the copy-forgery-inhibited pattern image by detecting the position of the dots of the copy-forgery-inhibited pattern image.

Figure 28:
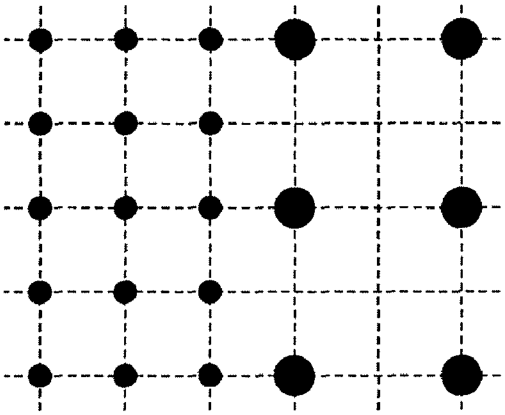
FIG. 28 depicts a configuration of dots that configure the copy-forgery-inhibited pattern image.

Following is a description of a process of generating the copy-forgery-inhibited pattern image according to the second embodiment. FIG. 28 depicts a configuration of the dots that configure the copy-forgery-inhibited pattern image. The configuration, as depicted in FIG. 28, is configured of a gathering of small dots and a gathering of large dots, such that the density is equivalent when viewed with the naked eye.

Figure 29:
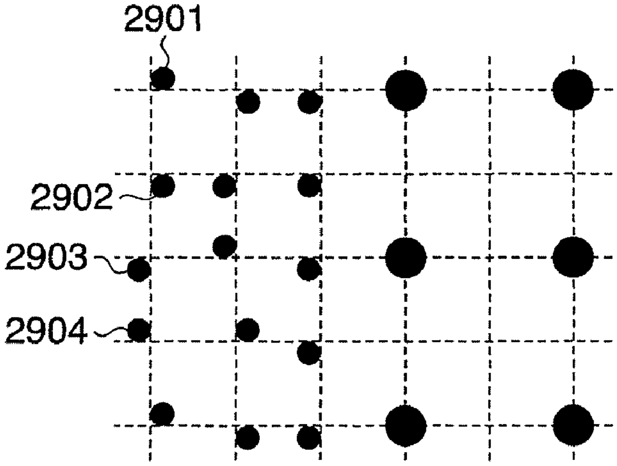
FIG. 29 depicts a state wherein a formation position of small dots is moved in order to identify the copy-forgery-inhibited pattern image.

A process of moving the formative positions of the small dots is performed when attaching the copy-forgery-inhibited pattern image, as depicted in FIG. 29. The process of moving the dots is divided into four types. The intersections of the dotted lines as depicted in FIG. 29 are the baseline positions of the small dots.

In FIG. 29, reference numerals 2901 through 2904 are four types of placement positions to which the dots are moved. The dot 2901 is moved to the upper right of its baseline position, and the dots 2902 through 2904 are moved to the lower right, lower left, and upper left of their baseline positions, respectively.

Figure 30:
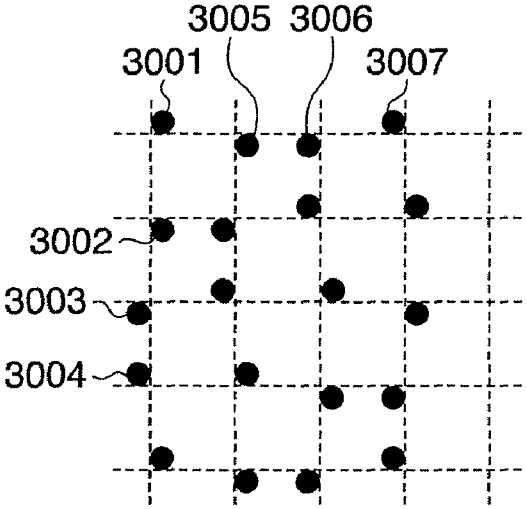
FIG. 30 depicts only the small dot component.

FIG. 30 depicts only the small dot component. If the original document contains the copy-forgery-inhibited pattern image, the dots are formed by moving from their baseline positions horizontally and vertically in an upper right, lower right, lower left, upper left sequence. In the example depicted in FIG. 30, the formation is of the dots 3001, 3005, 3006, and 3007 in the horizontal orientation, and the dots 3001, 3002, 3003, and 3004 in the vertical orientation. It is thus possible to differentiate between an original document with and without the copy-forgery-inhibited pattern image.

Figure 31:
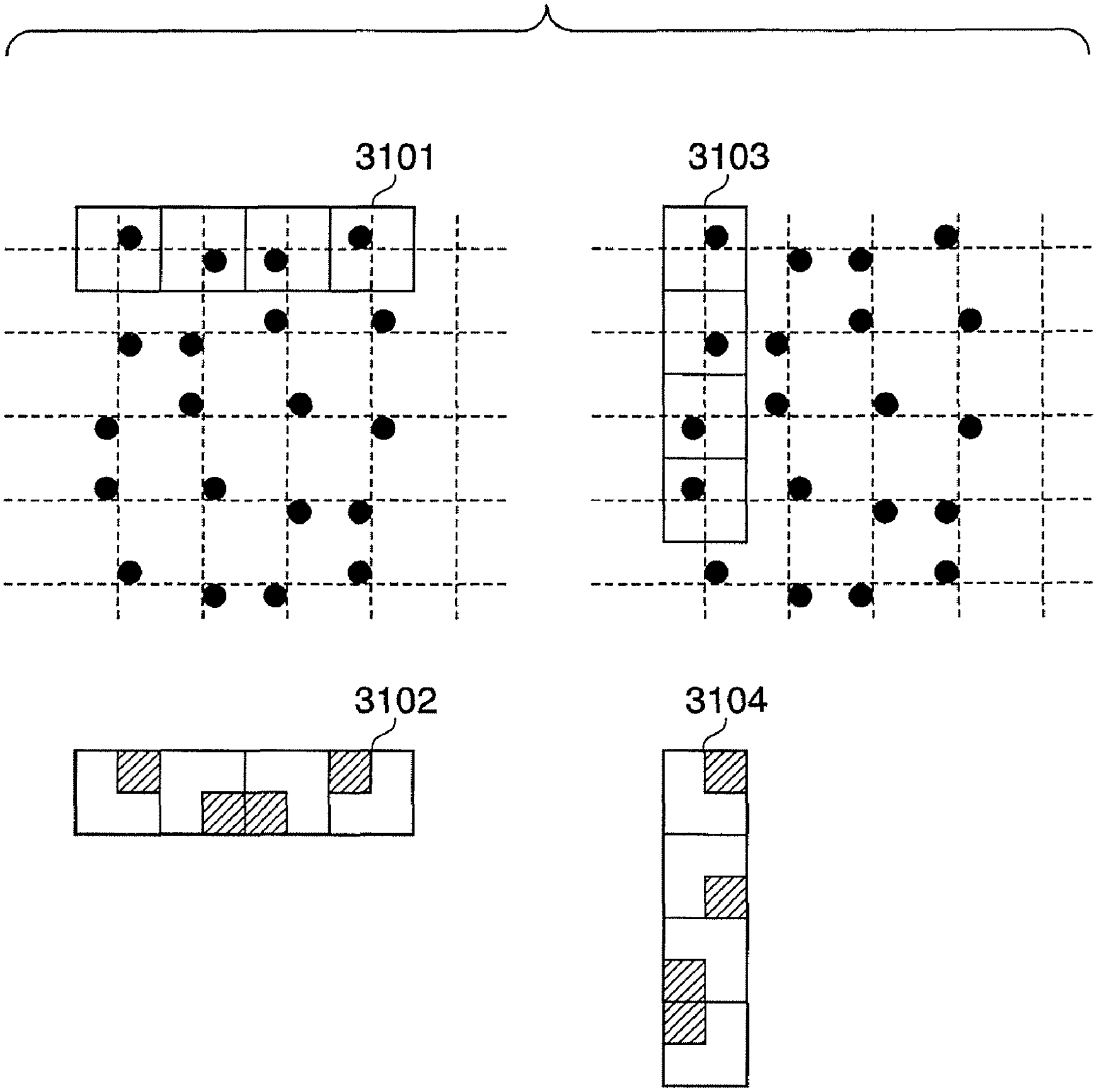
FIG. 31 describes a process of identifying the copy-forgery-inhibited pattern image.

Following is a description of the process of identifying the copy-forgery-inhibited pattern image that is contained within the original document, with reference to FIG. 31. The identification process is performed in the copy-forgery-inhibited pattern determination unit 307 of scanner image processing unit 216, as per the first embodiment.

FIG. 31 describes the process of identifying the copy-forgery-inhibited pattern image. As seen in FIG. 31, four windows 3101 are conceptually positioned in the horizontal orientation, and four windows 3103 are conceptually laid out in the vertical orientation, vis-à-vis the positioning of the small dots.

The window 3101 comprises a collection of four square windows, each of which takes a baseline position, as depicted by the intersection of a pair of dotted lines, as its center, and which is of a size sufficient to contain one dot per square. One square is divided into four segments, and the average density of the pixels in the region is detected. Reference numeral 3102 is the result of the detection of the average density of each respective region. It is apparent therefrom that the dot contained in the leftmost region in no. 3102 is in the upper right placement in the square. Similarly, it is possible to identify that the four adjacent dots are arranged in an upper right, lower right, lower left, upper left sequence.

It is possible to identify from a window 3103 and a result of an average density 3104 that the dots are also arranged in an upper right, lower right, lower left, upper left sequence in the vertical orientation. Identifying the upper right, lower right, lower left, upper left dot pattern makes it apparent that the original document contains the copy-forgery-inhibited pattern image.

Figure 32:
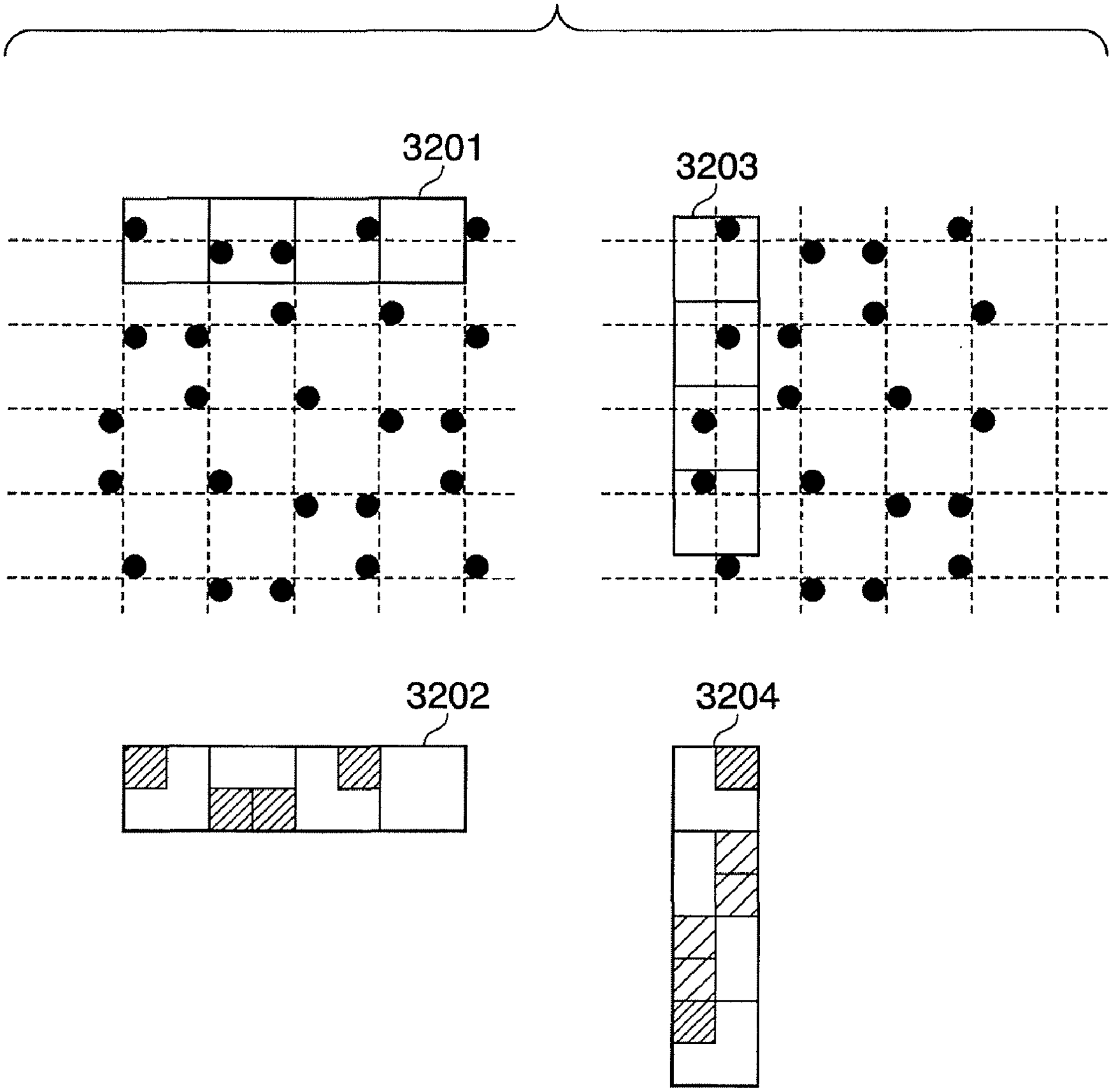
FIG. 32 depicts a variant example of the dot pattern depicted in FIG. 31.

Following, with reference to FIG. 32, is a description of a process that is applied when the window for detecting the dot placement is misaligned with the original document, due to an error in reading in the original document.

FIG. 32 depicts a variant example of the dot pattern depicted in FIG. 31. A window 3201 is misaligned to the right in the horizontal orientation by half the size of an individual square. In such a circumstance, a second square region of an average density result 3202 captures two dots, thus containing a two-area density within one square. All that is necessary in the circumstance is to shift the window a half-square in the horizontal orientation and detect the density of the small dots once more.

Reference numeral 3203 depicts an example of a window in the vertical orientation that is misaligned in the vertical orientation, by one-quarter of the width of the square. In such a circumstance, a region with a two-area density is detected within each of two squares, causing the density value thereof to be lighter than the density value of the reference numeral 3202. Accordingly, the region information that possesses the density value of each respective square and the density value thereof allow detecting the horizontal or vertical misalignment of the window.

The processing subsequent to identifying whether or not the original document contains the copy-forgery-inhibited pattern image is as described in FIG. 24 through FIG. 27, according to the first embodiment.

While the small dot position when the copy-forgery-inhibited pattern image is attached is given as the upper right, lower right, lower left, upper left according to the second embodiment, the small dot position is not limited thereto.

While the example of the window for detecting the dot position has been either a 1×4 or a 4×1 arrangement, it would be permissible to employ a 2×2 or other square window, or a window of a different size. Other position patterns also exist, and it would be permissible to apply a different pattern depending on the type of character string that is contained within the copy-forgery-inhibited pattern image, for example.

When the original document is being read in, it is conceivable that the user may rotate the orientation thereof by 90, 180, or 270 degrees. In such a circumstance, it would suffice to have four dot patterns corresponding to the degree of rotation, such as the upper right, lower right, lower left, upper left, and to detect the dot pattern accordingly.

It is possible, according to the embodiment, to minimize undesirable copying of the original document that includes the copy-forgery-inhibited pattern, when the copy-forgery-inhibited pattern is present therein, by controlling the under color removal process or the density correction process vis-à-vis the original document.

The present invention may be applied to a system that is configured of a plurality of devices, such as, for example, a host computer, an interface device, a document reader, and a printer, as well as an apparatus that is comprised of a single device, such as, for example, a copier or a fax machine.

A storage medium whereupon is written a program code of a software that implements the function of the embodiments is supplied to the system or the apparatus, and the computer, either a CPU or an MPU, of the system or the apparatus loads and executes the program code that is written to the storage medium. It goes without saying that the object of the present invention is achieved thereby.

In such a circumstance, the program code that is loaded from a computer-readable storage medium itself implements the functions of the embodiments, thereby making the storage medium whereupon the program code is written a configuration of the present invention.

Examples of a storage medium that might be used for supplying the program code would include a flexible disk, a hard drive, an optical disc, a magneto-optical disk, a CD-ROM, a CD-R, a magnetic tape, a nonvolatile memory card, or a ROM.

It also goes without saying that the functions of the embodiments are implemented by an operating system or other software running on the computer performing the actual processing, in whole or in part, in accordance with the directions of the program code, as well as by the loading and execution of the program code by the computer.

It also goes without saying that the functions of the embodiments are implemented by loading the program code from the storage medium to a memory on an extension board that is inserted into the computer, or in an extension unit that is attached to the computer, and having the CPU or other device that is built into the extension board or the extension unit perform the actual processing, in whole or in part, in accordance with the directions of the program code.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-198708, filed Jul. 20, 2006, and Japanese Patent Application No. 2007-104216, filed Apr. 11, 2007, which are hereby incorporated by reference herein in their entirety.

What is claimed is:

1. An image processing apparatus, comprising:

a retrieval unit adapted to extract a plurality of character strings that are present within an inputted image, and to retrieve a plurality of identical character strings within the plurality of extracted character strings;

a determination unit adapted to determine whether or not the plurality of identical character strings retrieved by said retrieval unit are laid out regularly; and a processing unit adapted to carry out a process on the inputted image in accordance with a determination result of the determination unit, wherein said retrieval unit extracts a plurality of character strings that are present within the inputted image after a light color has been removed from the inputted image, and retrieves a plurality of identical character strings from among the plurality of extracted character strings; and said processing unit carries out a process on the inputted image, as it exists prior to the light color being removed therefrom, in accordance with a determination result from said determination unit.

2. The image processing apparatus according to claim 1, wherein said processing unit:

determines that the inputted image contains a copy-forgery-inhibited pattern image, if said determination unit determines that the plurality of identical character strings retrieved by said retrieval unit are laid out regularly;

determines that the inputted image does not contain a copy-forgery-inhibited pattern image, if said determination unit determines that the plurality of identical character strings retrieved by said retrieval unit are not laid out regularly; and carries out a process on the inputted image in accordance with the determination.

3. The image processing apparatus according to claim 2, wherein a user is notified if the inputted image contains the copy-forgery-inhibited pattern image, and a setting is performed that attaches a copy-forgery-inhibited pattern image.

4. The image processing apparatus according to claim 3, wherein the user is notified by a screen being displayed that requests a change in the setting.

5. The image processing apparatus according to claim 1, wherein:

said determination unit determines that the plurality of identical character strings retrieved by said retrieval unit are laid out regularly in a case where a positional relationship between a first character string and a second character string among the plurality of identical character strings retrieved by said retrieval unit is essentially identical to a positional relationship between a third character string and a fourth character string among the plurality of identical character strings retrieved by said retrieval unit.

6. The image processing apparatus according to claim 1, wherein said processing unit:

prohibits the inputted image from being printed, if said determination unit determines that the plurality of identical character strings are laid out regularly; and performs printing of the inputted image, if said determination unit determines that the plurality of identical character strings are not laid out regularly.

7. The image processing apparatus according to claim 1, wherein:

the plurality of character strings are extracted by extracting a plurality of text characters within the inputted image that are adjacent, with a distance therebetween being not greater than a prescribed distance.

8. The image processing apparatus according to claim 1, further comprising:

a second determination unit adapted to determine a color of each extracted text character, wherein said processing unit carries out a process on the inputted image, in accordance with a determination result of said second determination unit.

9. The image processing apparatus according to claim 1, further comprising a decision-making unit adapted to decide a size of each extracted text character, wherein said processing unit carries out a process on the inputted image, in accordance with a decision result of said decision unit.

10. The image processing apparatus according to claim 1, wherein, if said determination unit determines that the plurality of identical character strings are laid out regularly, said processing unit does not perform an under color removal process on the inputted image.

11. The image processing apparatus according to claim 1, wherein, if said determination unit determines that the plurality of identical character strings are laid out regularly, said processing unit does not perform a density correction process on the inputted image.

12. The image processing apparatus according to claim 1, wherein, if said determination unit determines that the plurality of identical character strings are laid out regularly, said processing unit does not perform a conversion of the inputted image into a digital file.

13. A control method of an image processing apparatus, comprising:

extracting a plurality of character strings that are present within an inputted image;

retrieving a plurality of identical character strings within the plurality of extracted character strings;

determining whether or not the plurality of identical character strings retrieved in said retrieving step are laid out regularly; and carrying out a process on the inputted image in accordance with a determination result of said determining step, wherein said extracting step extracts a plurality of character strings that are present within the inputted image after a light color has been removed from the inputted image, and said retrieving step retrieves a plurality of identical character strings from among the plurality of extracted character strings; and the process is carried out on the inputted image, as it exists prior to the light color being removed therefrom, in accordance with a determination result of said determining step.

14. A program, which has been recorded on a computer-readable storage medium, for causing a computer to execute the control method of the image processing apparatus according to claim 13.

15. A computer-readable storage medium storing a program for causing a computer to execute the control method of the image processing apparatus according to claim 13.

* * * * *